United States Patent
Von Koenigsegg

(10) Patent No.: US 11,292,213 B2
(45) Date of Patent: Apr. 5, 2022

(54) FIBER-REINFORCED STRUCTURES

(71) Applicant: Alpraaz AB, Angelholm (SE)

(72) Inventor: Christian Von Koenigsegg, Vejbystrand (SE)

(73) Assignee: Alpraaz AB, Angelholm (SE)

( * ) Notice: Subject to any disclaimer, the term of this patent is extended or adjusted under 35 U.S.C. 154(b) by 473 days.

(21) Appl. No.: 15/536,037

(22) PCT Filed: Dec. 17, 2015

(86) PCT No.: PCT/EP2015/080149
§ 371 (c)(1),
(2) Date: Jun. 14, 2017

(87) PCT Pub. No.: WO2016/097093
PCT Pub. Date: Jun. 23, 2016

(65) Prior Publication Data
US 2017/0341318 A1    Nov. 30, 2017

(30) Foreign Application Priority Data

Dec. 19, 2014 (EP) ..................... 14199259

(51) Int. Cl.
*B29C 70/44* (2006.01)
*B29C 33/40* (2006.01)
(Continued)

(52) U.S. Cl.
CPC ............ *B29C 70/446* (2013.01); *B29C 33/40* (2013.01); *B29C 33/448* (2013.01); *B29C 33/52* (2013.01);
(Continued)

(58) Field of Classification Search
CPC ............................................... B29C 43/3642
(Continued)

(56) References Cited

U.S. PATENT DOCUMENTS 1,504,547 A    8/1924    Egerton
2,345,977 A    4/1944    Howald et al.
(Continued)

FOREIGN PATENT DOCUMENTS

DE    102007057198 A1    6/2009
EP    2043832    11/2012
(Continued)

OTHER PUBLICATIONS

Shahkarami. Material Characterization for Processing: CYTEC Cycom 5215, Nov. 15, 2009. (Year: 2009).*
(Continued)

*Primary Examiner* — Matthew J Daniels
*Assistant Examiner* — Hana C Page
(74) *Attorney, Agent, or Firm* — Schott, P.C.

(57) ABSTRACT

A method for manufacturing a fiber reinforced structure includes the following. A mandrel of a first material comprises a hollow interior and an aperture that allows a fluid to enter the interior. A layer of a second material provided on the mandrel includes an uncured resin and fibers. The mandrel and the layer are placed in a mold cavity formed by a mold. A pressurized fluid is introduced into the interior of the mandrel via the aperture to generate a force acting to expand the mandrel outward. The mandrel is heated so that it becomes deformable and expand outward to press the layer against the mold. The layer is heated so that it cures. The mandrel is then heated to a temperature above its melting point of the first material so that it melts, after which it is removed.

17 Claims, 15 Drawing Sheets

(51) Int. Cl.
  *B29C 49/44* (2006.01)
  *B29C 33/52* (2006.01)
  *B29C 53/56* (2006.01)
  *B29C 33/44* (2006.01)
  *B29C 53/82* (2006.01)
  *B29K 21/00* (2006.01)
  *B29K 105/12* (2006.01)
  *B29K 63/00* (2006.01)
  *B29K 105/06* (2006.01)
  *B29K 223/00* (2006.01)
  *B29K 307/04* (2006.01)
  *B29L 22/00* (2006.01)

(52) U.S. Cl.
  CPC ............ *B29C 49/44* (2013.01); *B29C 53/566* (2013.01); *B29C 53/822* (2013.01); *B29K 2021/006* (2013.01); *B29K 2063/00* (2013.01); *B29K 2105/06* (2013.01); *B29K 2105/12* (2013.01); *B29K 2223/06* (2013.01); *B29K 2307/04* (2013.01); *B29L 2022/00* (2013.01)

(58) Field of Classification Search
  USPC .......................................................... 264/512
  See application file for complete search history.

(56) References Cited

U.S. PATENT DOCUMENTS

| | | | |
|---|---|---|---|
| 3,377,657 | A | 4/1968 | Richardson et al. |
| 4,248,817 | A | 2/1981 | Frank |
| 4,822,272 | A | 4/1989 | Yanase et al. |
| 4,923,541 | A | 5/1990 | Burger |
| 5,061,418 | A | 10/1991 | Ware |
| 5,136,515 | A † | 8/1992 | Helinski |
| 5,622,733 | A | 4/1997 | Asher |
| 6,036,470 | A | 3/2000 | Basso et al. |
| 6,238,506 | B1 * | 5/2001 | Satoh ................ B62D 1/04 156/169 |
| 6,264,868 | B1 | 7/2001 | Marchant |
| 6,612,824 | B2 † | 9/2003 | Tochimoto |
| 8,337,740 | B2 * | 12/2012 | Rodman ............ B29C 43/3642 264/314 |
| 8,491,988 | B2 | 7/2013 | Yamasaki et al. |
| 8,506,865 | B2 | 8/2013 | Wangenheim |
| 8,697,586 | B2 | 4/2014 | Balthes et al. |
| 8,794,951 | B2 | 8/2014 | Yoneshima et al. |
| 10,137,632 | B2 † | 11/2018 | Mantell |
| 2007/0096368 | A1 | 5/2007 | Hanson et al. |
| 2010/0015265 | A1 * | 1/2010 | Vontell ............... B29C 33/3842 425/53 |
| 2010/0029155 | A1 | 2/2010 | Peterson et al. |
| 2010/0164147 | A1 | 7/2010 | Rodman |
| 2010/0186899 | A1 | 7/2010 | Jackson et al. |
| 2010/0255235 | A1 | 10/2010 | Ilzhoefer et al. |
| 2013/0059939 | A1 | 3/2013 | Sato |
| 2013/0101406 | A1 | 4/2013 | Kweder et al. |
| 2013/0137325 | A1 | 5/2013 | Davies et al. |
| 2013/0193623 | A1 | 8/2013 | Kashikar |
| 2013/0323993 | A1 | 12/2013 | Schmitt et al. |
| 2013/0337713 | A1 | 12/2013 | Young et al. |
| 2014/0124972 | A1 | 5/2014 | Burgin et al. |
| 2014/0239531 | A1 | 8/2014 | Jiansheng |
| 2014/0255665 | A1 | 9/2014 | Hillier et al. |
| 2015/0183139 | A1 * | 7/2015 | Takano ................ B29C 70/44 264/219 |

FOREIGN PATENT DOCUMENTS

| | | |
|---|---|---|
| EP | 2305749 B1 | 3/2013 |
| EP | 2594381 A1 | 5/2013 |
| EP | 2602093 A2 | 6/2013 |
| EP | 2608949 A2 | 7/2013 |
| EP | 2611587 A1 | 7/2013 |
| EP | 2647488 A2 | 10/2013 |
| EP | 2527139 B1 | 1/2014 |
| EP | 2689059 A2 | 1/2014 |
| EP | 2502788 B1 | 3/2014 |
| EP | 2752577 A2 | 7/2014 |
| EP | 2279782 B1 | 8/2014 |
| EP | 2558280 B1 | 8/2014 |
| EP | 2762298 A1 | 8/2014 |
| EP | 2314642 B1 | 9/2014 |
| JP | H01502577 A | 9/1989 |
| JP | H03027283 B2 | 4/1991 |
| JP | H110309741 A | 11/1999 |
| JP | 2008073876 A | 4/2008 |
| JP | 2007276428 A | 10/2008 |
| JP | 2009513391 A | 4/2009 |
| JP | 2003094449 A | 9/2009 |
| JP | 2011062846 A | 9/2009 |
| WO | 2012060971 A1 | 5/2012 |
| WO | 2013037811 A1 | 3/2013 |
| WO | 2013059062 A2 | 4/2013 |
| WO | 2013060568 A2 | 5/2013 |
| WO | 2014000742 A1 | 1/2014 |
| WO | 2014008244 A1 | 1/2014 |
| WO | 2014013137 A1 | 1/2014 |
| WO | 2014075198 A1 | 5/2014 |
| WO | 2014076352 A1 | 5/2014 |
| WO | 2014076353 A1 | 5/2014 |
| WO | 2016097093 A1 | 6/2016 |

OTHER PUBLICATIONS

Harper, C.A., "Modern Plastics Handbook," accessed on Nov. 10, 2018, pp. 1-4 (Mar. 31, 2003) [English Translation].
CN First Office Action dated Nov. 23, 2018, as received on Application No. 201580069531 [English Translation].
Epotek: "Cure Matters Determining the Proper Cure Schedule Cure Temperature Considerations", Aug. 18, 2014 (Aug. 18, 2014), XP055186701, Retrieved from the Internet <URL:http://www.epotek.com/site/files/brochures/pdfs/Cure_Matters_Final.pdf> [retrieved Apr. 29, 2015].
Epotek: "Frequently Asked Questions—Technical Service—Epoxy Technology Inc.", Aug. 18, 2014 (Aug. 18, 2014), XP055186696, Retrieved from the Internet <URL:https://web.archive.org/web/20140818000953/http://www.epotek.com/site/technical-material/frequently-asked-questions.html?catid=3> [retrieved on Apr. 29, 2015].
Japanese Office Action Notice of Reason(s) for Refusal, English Translation dated Oct. 8, 2019, in Japanese Patent Application No. 2017 532629, 6 pages.
European Office Action Communication Pursuant to Article 94 (3), dated Oct. 30, 2019, in European Application No. 15 817 214.8-1014, 6 pages.
Chinese office action for related Ser. No. 201580069531.9 dated Feb. 6, 2020.

\* cited by examiner
† cited by third party

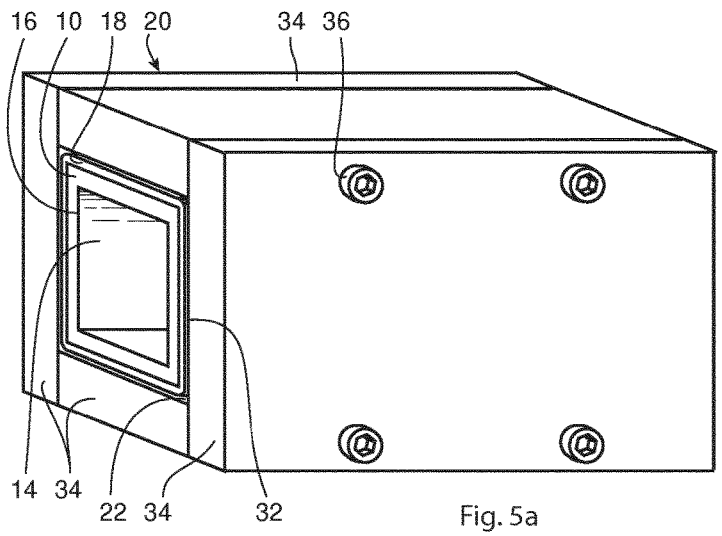
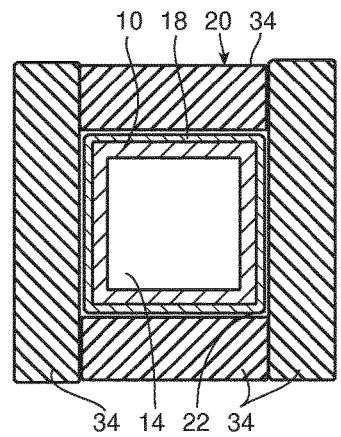
Fig. 5a   Fig. 5b
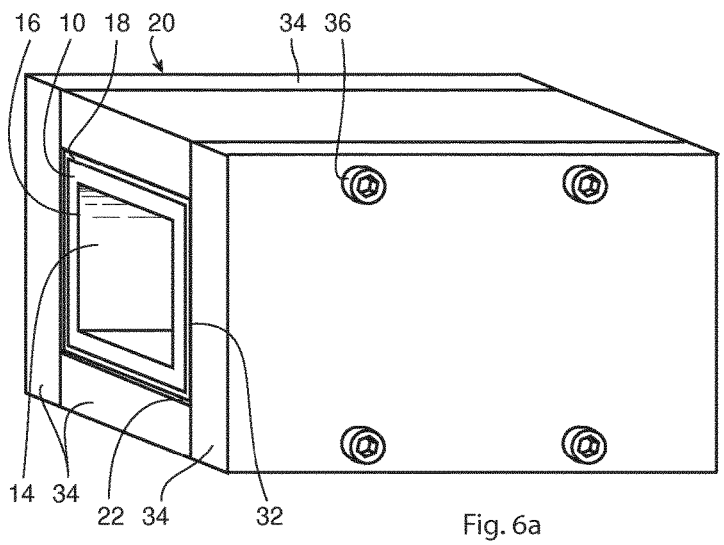
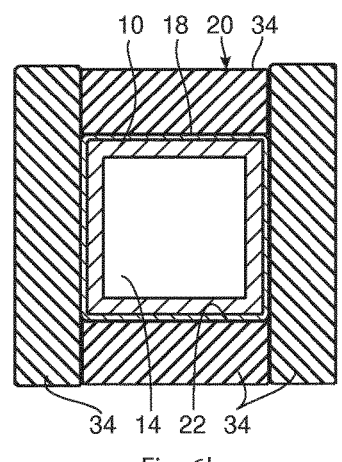
Fig. 6a   Fig. 6b
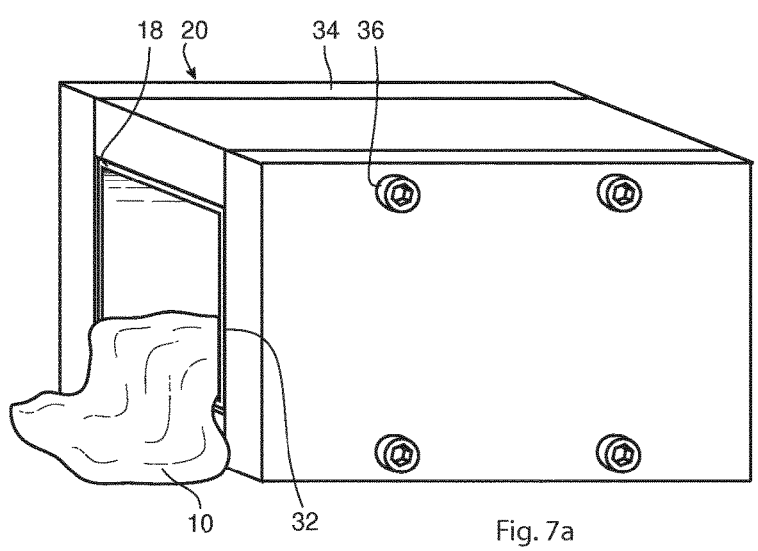
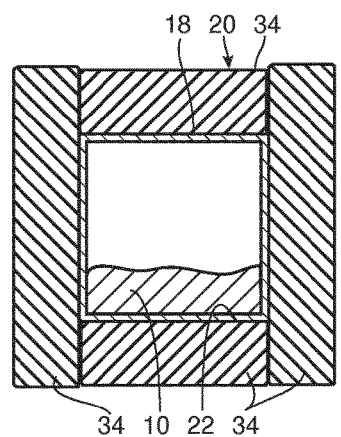
Fig. 7a   Fig. 7b

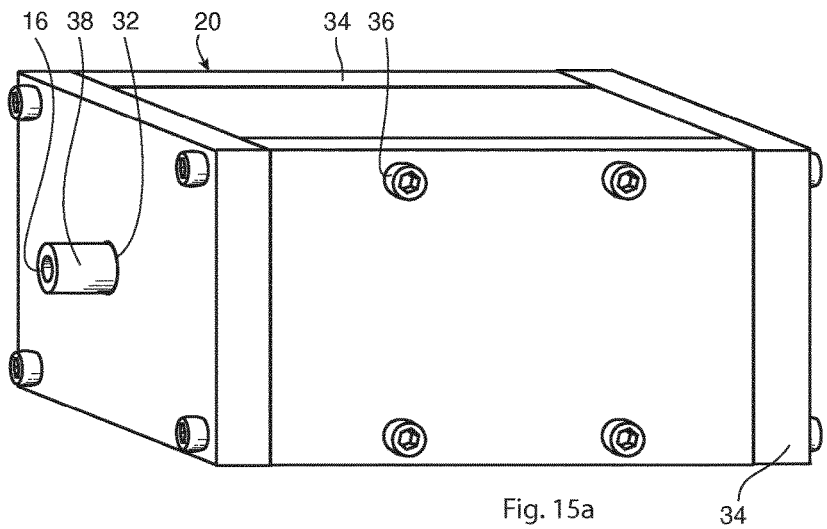 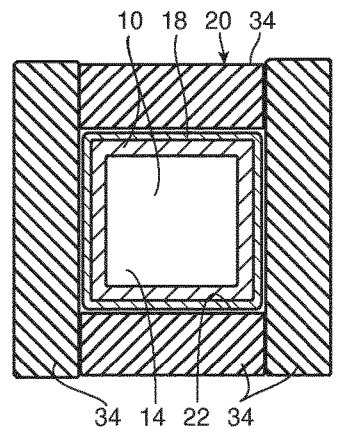
Fig. 15a  Fig. 15b
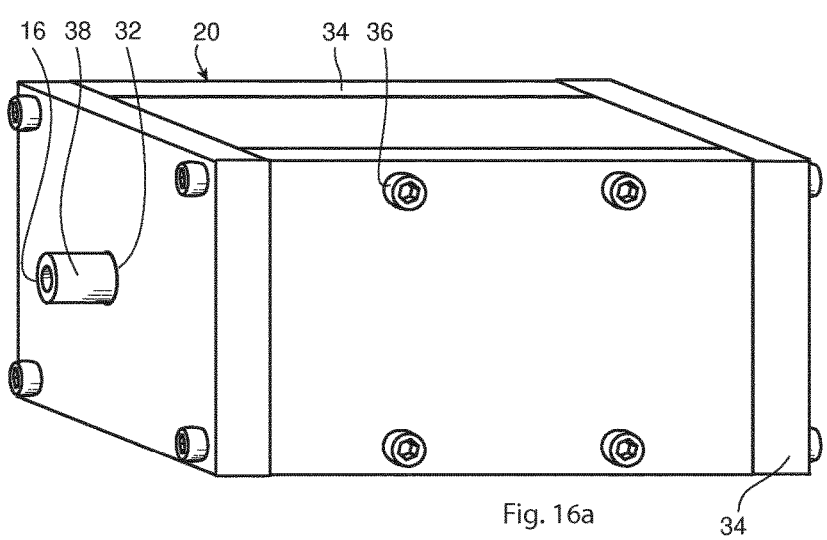 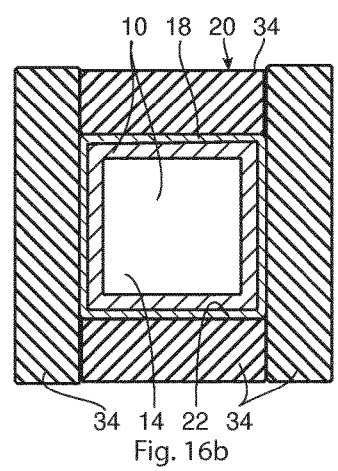
Fig. 16a  Fig. 16b
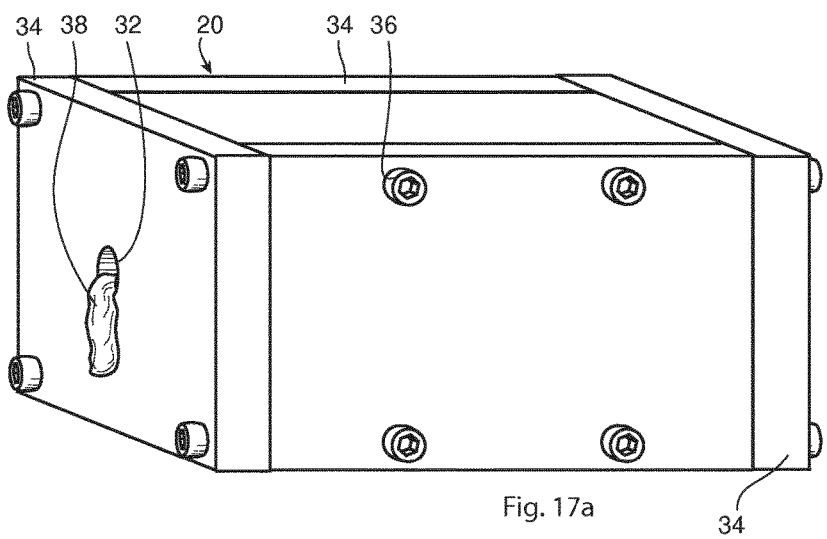 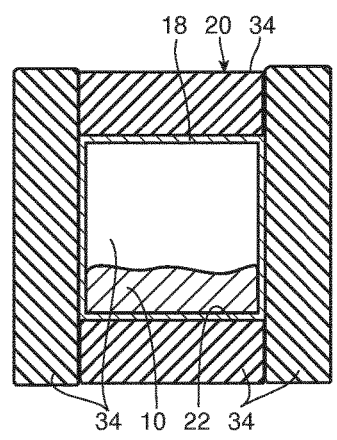
Fig. 17a  Fig. 17b

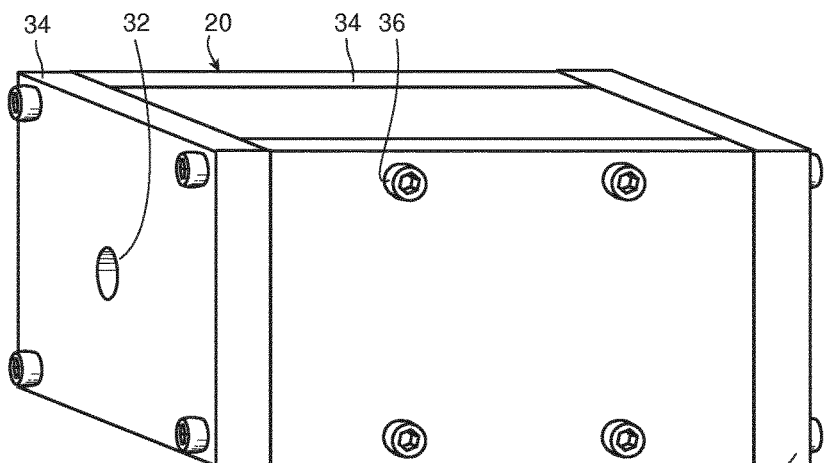
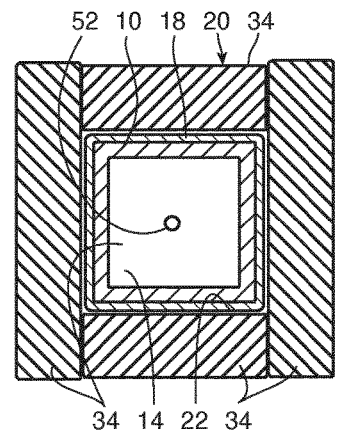
Fig. 25a
Fig. 25b
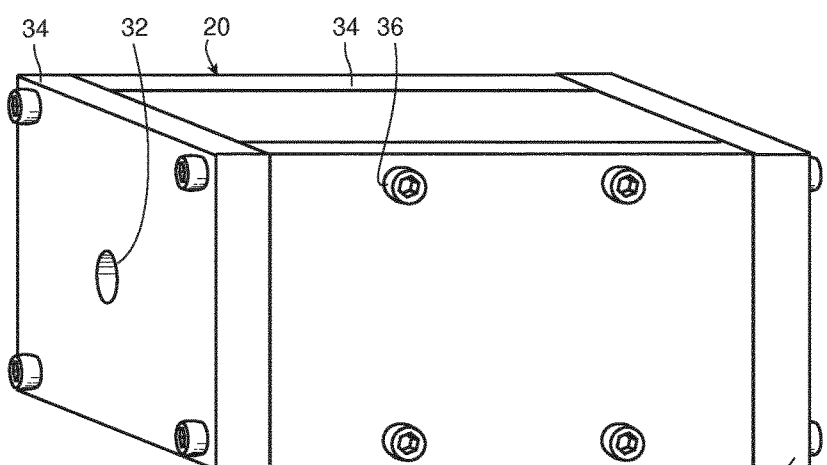
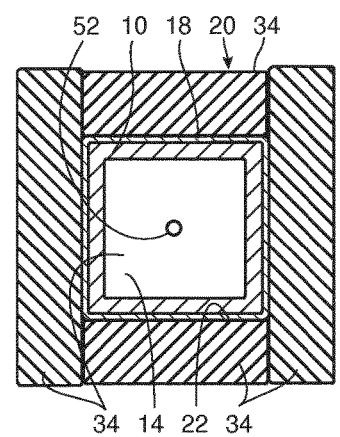
Fig. 26a
Fig. 26b
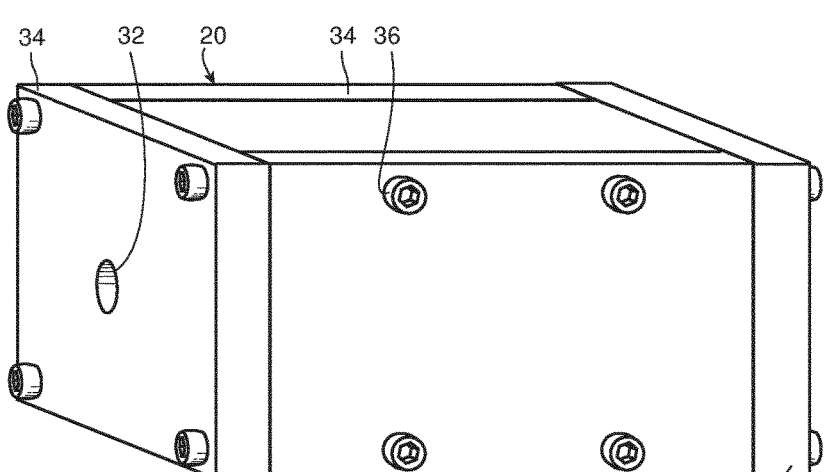
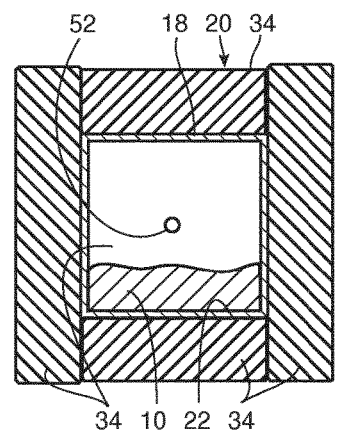
Fig. 27a
Fig. 27b

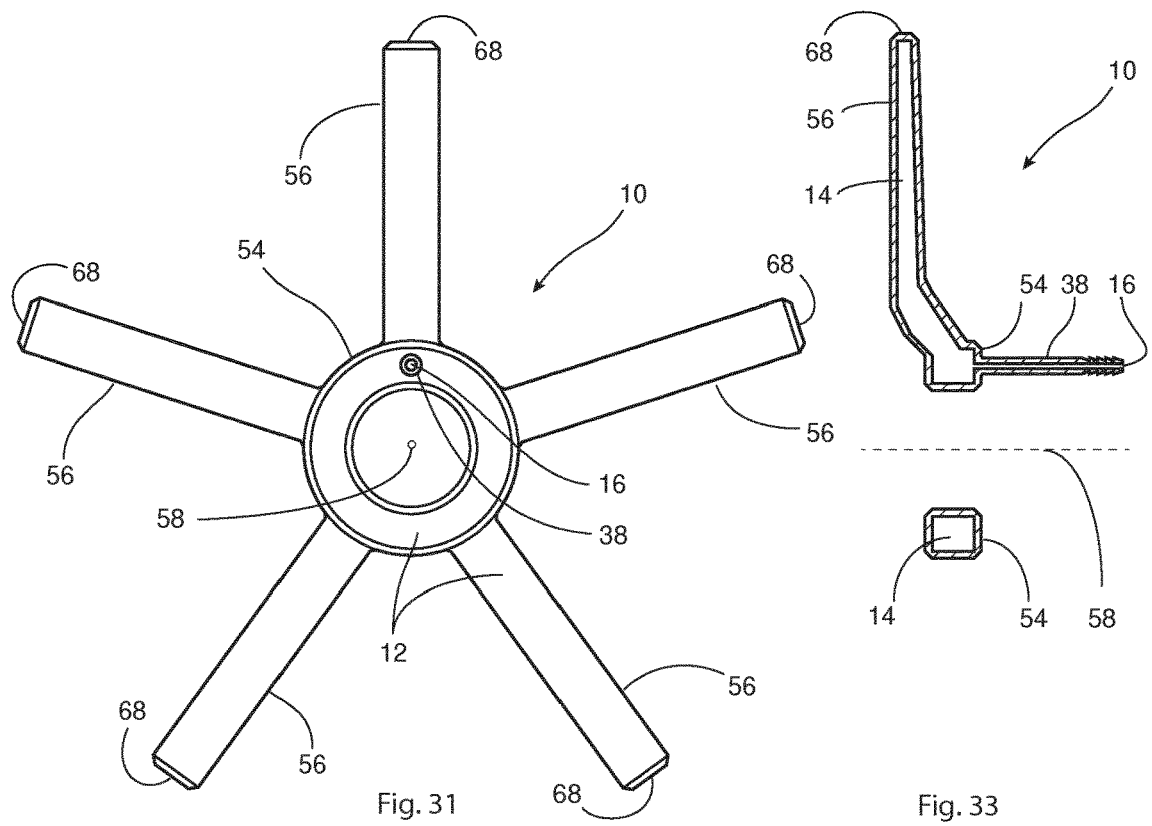
Fig. 31
Fig. 33
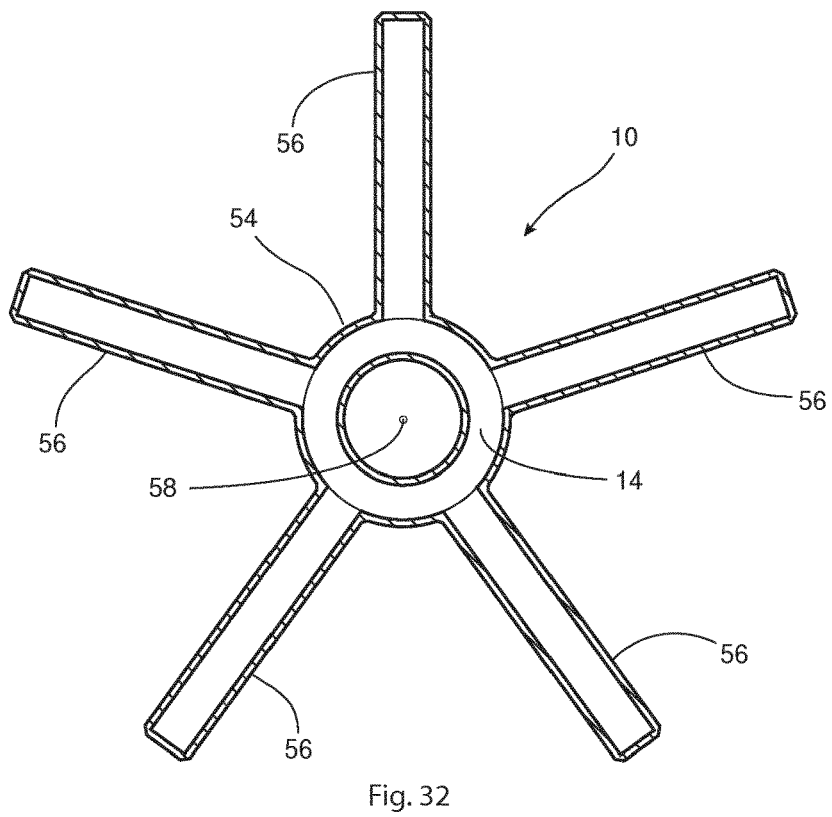
Fig. 32

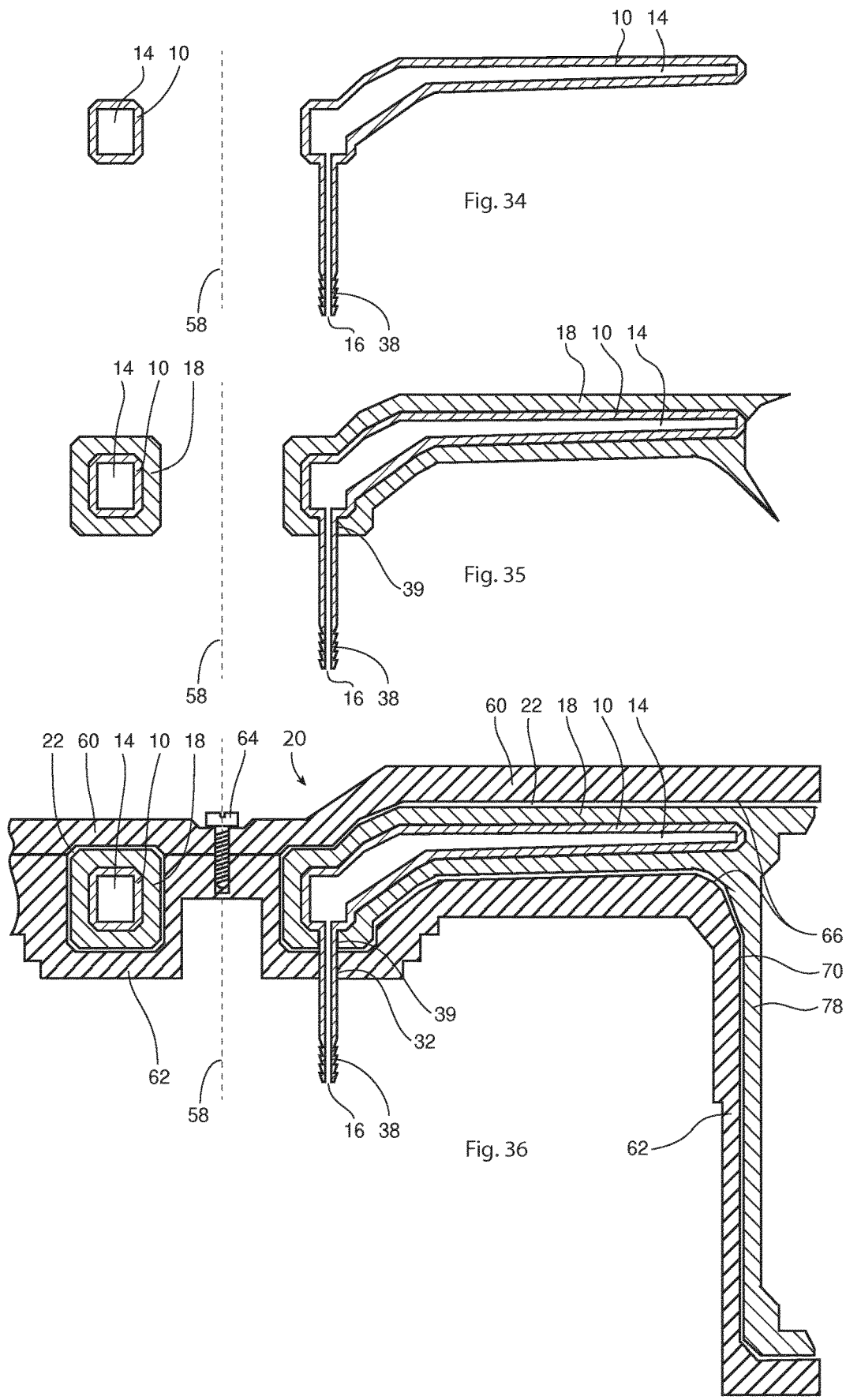

FIBER-REINFORCED STRUCTURES

TECHNICAL FIELD

The present invention relates to the manufacturing of fiber-reinforced structures. In particular, the present invention relates to the manufacturing of three-dimensional structures from a material comprising a resin and carbon fibers.

BACKGROUND

Components or structures with high strength to weight ratios have many applications, for example in air and space industries, and in high performance automotive industries. Such components can be manufactured from alloys, such as titanium and magnesium alloys. The alloys can be machined or cast with great precision and the structures can be manufactured within tight dimensional tolerances. Complex three dimensional shapes or hollow shapes can also be produced, for example with CNC machine tools or by cast molding.

Composite materials including fibers fixed by a resin are commonly used in components requiring a high strength to weight ratio. The strength to weight rations may even surpass those of some high-performance alloys. However, due to the nature of these composite materials, it may be difficult to manufacture structures with the tight dimensional tolerances and intricate details that are possible for alloys. This is particularly the case if a component is manufactured from pre-fabricated overlapping sheets, such as a resin impregnated weave or cloth, since the fibers reduces the flexibility of the sheets, making them less pliable. For example, it may be difficult to force a sheet to follow a sharp contour, such as a tight inner corner of a mold cavity. Further, high performance structures of complex three-dimensional shapes having hollow portions are typically hard to manufacture, in particular from overlapping sheets.

It is therefore an object of the invention to provide a method of manufacturing fiber-reinforced structures that sets aside the abovementioned drawbacks and to generally improve the manufacturing of fiber-reinforced structures. More specifically, it is an object of the invention to provide fiber-reinforced structures with improved strength to weight ratios. It is a further object to provide a method of manufacturing fiber-reinforced three-dimensional structures with tight dimensional tolerances. Further objects of the invention are to improve the structural strength or strength to weight ratios of fiber-reinforced structures, to allow a greater freedom in shaping and forming fiber-reinforced structures.

SUMMARY

The above objects, and additional objects that can be construed from the summary and description below, are achieved by the four different aspects of the invention that are described below. Possible modifications of the aspects are described in this section and in the detailed description.

The first aspect is a method for manufacturing a structure reinforced by fibers. The method comprises:
(i) providing a mandrel of a first material, wherein the mandrel comprises an outside surface, a hollow interior, and an aperture for allowing a fluid to enter the interior, the first material is rigid at room temperature and has a melting temperature at which it melts, and the first material becomes deformable when approaching the melting temperature, and
(ii) providing a layer of a second material on the outside surface of the mandrel without blocking the aperture, wherein the second material comprises an uncured thermo-setting resin and fibers configured for reinforcing the structure, the second material has a curing temperature below which it is pliable and above which it cures. Additionally, the method comprises:
(iii) placing the mandrel and the layer in a mold cavity formed by a mold, wherein the mold is configured to allow a fluid to reach the aperture of the mandrel, and
(iv) introducing a pressurized fluid into the interior of the mandrel via the aperture for generating a force acting to expand the mandrel outward, heating the mandrel to a temperature below the melting temperature of the first material for making the mandrel deformable and allowing the mandrel to expand outward and press the layer against the mold, and heating the layer to a temperature above the curing temperature of the second material to cure and form the structure. The method also comprises:
(v) heating the mandrel to a temperature above the melting point of the first material for melting the mandrel. The method may further comprise:
(vi) removing the melted mandrel from the structure.

The method as a whole allows for structures of more complex shapes to be formed, in particular structures having hollow portions. For example, the mandrel, or core, provided in step (i) may be of a complex shape, and the mold may be configured to reflect the complex shape, which will then show in the final structure. Further, in step (ii), providing a layer of a second material on the outside surface of the mandrel may be configured to define a complex portion of the structure. The configuration of the mold in step (iii) to allow a fluid to reach the aperture of the mandrel allows for the mandrel and the form to cooperate in step (iv) and together form the shape of the final structure. Since the mandrel is melted in step (v) before removal in step (vi), the opening can be kept small and have little influence on the overall shape of the structure. Thus, all the steps (i)-(vi) of the method contribute synergistically to a greater freedom in shaping and forming fiber-reinforced structures. This greater freedom allows for a structure of a specific function to be optimized with respect to structural strength and strength to weight ratio.

Other synergetic effects of the method are described below. The step (iv), which is made possible by steps (i)-(iii), causes the layer to begin curing when it is pressed against the mold, which contribute to improve the strength to weight ratio of the final structure, since the second material is compacted. Further, the mandrel provided in step (i) and the mold in step (iii) makes it possible for the pressurized fluid to convey a high pressure to the interior of the mandrel in step (iv), thus allowing the mold to have more intricate details and sharp features, such as tight inner corners. Thus, the mandrel and mold allows for a greater freedom in the shaping and forming of the structure. The step (iv) also forces the layer against the mold while it begins to cure, which contributes improve the dimensional tolerances of the final structure, in particular if a high pressure of the pressurized fluid is used.

The structure may be a hollow structure. In step (ii), the layer may be provided to cover the entire or a portion of the outside surface of the mandrel. In step (ii), the layer may be provided to enclose or enfold the mandrel or a portion of the mandrel. Further, in step (ii), providing a layer of a second material on the outside surface of the mandrel may be configured to define a hollow space in the structure or a portion of the structure.

Room temperature is here understood to encompass, but not limited to, the ambient temperature at which the method as a whole is performed, or the ambient temperature at which the step (ii) is performed. The room temperature may be in the range 10-50° C., in the range 20-23° C., or approximately 21° C. Additionally or alternatively, the second material may be pliable at room temperature. Pliable is here understood to encompass flexible. The first material becoming deformable is here understood to encompass the first material becoming elastic, pliable, flexible, soft, and/or yielding.

The temperature at which the first material changes from being pliable to liquid may be hard to define or not correspond to an exact temperature. In these cases, the melting temperature should be understood as an approximate indication where this change occurs. For example, the melting temperature may be the mean temperature of a range of temperatures at which the change occurs, or one of the endpoints of such a range.

Similarly, the curing temperature of the resin may be hard to define, or not corresponding to an exact temperature. Then, the curing temperature should be understood as encompassing an approximate indication of the lowest temperature where an industrially applicable or operationally efficient curing can take place or starts. For example, the curing temperature may be the mean temperature of a range of temperatures at which curing occurs in an industrially applicable or operationally efficient way, or the lower or upper endpoint of such a range. The cured resin may have a glass-transition temperature that is above the melting temperature of the first material. In the curing of the resin, gelation or an initial curing may be achieved below the melting temperature of the first material, while vitrification or full cure may be achieved above the melting temperature of the first material. In the step (iv), the layer may be heated to a temperature below the melting temperature of the first material.

The step (ii) may further comprise: providing the layer with one or more openings, wherein each of the one or more openings is configured to prevent, or has a dimension that prevents, the mandrel from being removed through the one or more openings prior to a melting of the mandrel. Further, each of the one or more openings may be configured to allow, or has a dimension that allows, the mandrel to be removed through the one or more openings subsequent to a melting of the mandrel. The mandrel may be stiff and or self-supporting at room temperature.

The step (iv) may further comprise: supplying heat to the interior of the mandrel for heating the mandrel to the temperature below the melting temperature of the first material and for heating the layer to the temperature above the curing temperature of the second material. The curing temperature of the second material may be lower than the melting temperature of the first material. This is advantageous if the heat is supplied to the interior of the mandrel, since the heat has to pass through the mandrel before it reaches the layer, which means that the former typically reaches a higher temperature in a given time. Thus, if the curing temperature of the second material were to be higher than the melting temperature of the first material, the mandrel would melt before the curing of the layer has started.

The step (iv) may further comprise: supplying heat to the mold for heating the mandrel inside the mold to the temperature below the melting temperature of the first material and for heating the layer inside the mold to the temperature above the curing temperature of the second material. The curing temperature of the second material may be higher than the melting temperature of the first material. This is advantageous if the heat is supplied to the mold, since the heat has to pass through the layer before it reaches the mandrel, which means that the former typically reaches a higher temperature in a given time. Thus, if the curing temperature of the second material were to be lower than the melting temperature of the first material, there is a risk that the mandrel will not become deformable and press the layer against the mold before the layer starts to cure. The aperture may be the only access to the interior of the mandrel from outside the mold. This means that in the volume of the pressurized fluid that enter into the interior of the mandrel via the aperture in step (iv) will be limited by the volume of interior of the mandrel, and possibly also by the volume of the mold cavity if the mandrel does not completely cover the inside of the mold. There may also be other aperture through which the pressurized fluid can enter into the interior of the mandrel, which will further limit the volume passing through the first aperture. The mandrel may comprise an additional aperture for allowing a fluid to leave the interior of the mandrel. In this configuration, the volume of the pressurized fluid that enter into the interior of the mandrel via the aperture in step (iv) will be limited by flow that is generated though the aperture and the additional aperture.

The mold may have an opening to allow access to the mold cavity from outside the mold. The opening may be configured to allow access to the aperture from outside the mold, or the aperture may be configured to be accessible from outside the mold via the opening. In step (vi), removing the melted mandrel from the structure may comprise: removing the melted mandrel via the opening or cause the melted material to flow out from the mold cavity via the opening. This means that the same opening may be used for increasing the pressure in the interior of the mandrel and for removing the melted mandrel from inside the mold cavity, which allows for a structure with a single hole and a greater freedom in forming the structure.

A second aspect of the invention is a mandrel for being placed in mold cavity of a mold having an opening to allow access to the mold cavity from outside the mold. The mandrel comprises a hollow interior and an aperture for allowing a fluid to enter the interior, wherein the mandrel is configured to allow the aperture to be accessed via the opening when the mandrel is placed in the mold cavity. Further, the mandrel is of a first material that is rigid at room temperature and has a melting temperature at which it melts, and the first material becomes deformable when approaching the melting temperature. The mandrel of the second aspect allows for the method of first aspect to be performed.

A third aspect of the invention is a molding system comprising:

a mold having a mold cavity and an opening to allow access to the mold cavity from outside the mold, and a mandrel comprising a hollow interior and an aperture for allowing a fluid to enter the interior. The mandrel is configured to allow the aperture to be accessed via the opening when the mandrel is placed in the mold cavity. The mandrel is of a first material that is rigid at room temperature and has a melting temperature at which it melts, and the first material becomes deformable when approaching the melting temperature. The mandrel may be configured to form a space between it and the mold for housing a layer provided on at least a portion of the mandrel. The molding system of the third aspect allows for the method of first aspect to be performed.

The mandrel according second aspect and the molding system according to the third aspect may be configured to be used in the method according the first aspect, with or without any of the modifications of the method described throughout these specifications.

A fourth aspect of the present invention is a structure manufactured by the method according to the first aspect.

DETAILED DESCRIPTION

Further possible modifications of the aspects of the invention are described below. The modifications involve additional or alternative features or functions that may be applied to the aspects of the invention.

In the first and fourth aspects, the first material may be a thermoplastic. The thermoplastic may be composed of or comprise polyethylene. The resin may comprise an epoxy resin. This combination of materials typically has the advantage that the first material does not stick to the second material after the mandrel has melted, and the first material can easily be removed from the structure, e.g. by tilting the structure or mold for allowing the melted first material to flow away. Further, this choice of materials will typically cause the walls of the final structure that have been in contact with the mandrel to be smooth and glossy. The second material may be a preimpregnated carbon fiber weave or cloth, for example the HexPly® prepregs manufactured by Hexcel Corporation, such as HexPly® M26T and HexPly®M76.

Additionally and alternatively, the polyethylene may be a high-density polyethylene. The first material may comprise polypropylene. The resin may comprise melamine, phenol formaldehyde, polyester, polyimide, and/or vinyl ester. The fibers may comprise carbon fibers. Alternatively or additionally, the fibers may comprise aramid fibers, glass fibers, and/or vegetable fibers. The vegetable fibers may comprise hemp fibers.

The first material may be chosen from a range of materials having a melting temperature, or melting point, within 85-145° C. The second material may be chosen from a range of materials having a curing temperature within 110-135° C.

In step (iv), the pressurized fluid may increase the pressure in the interior of the mandrel to a pressure of more than 5 bar, preferably more than 7 bar. The heating of the mandrel in step (iv) may comprise: heating the mandrel to a temperature in the range 110-140° C., preferably 120° C. The heating of the layer in step (iv) may comprise: heating the layer to a temperature in the range 110-140° C., preferably 120° C. The heating of the layer in step (iv) may comprise: heating the layer and the mandrel to the same temperature. The heating of the mandrel in step (v) may comprise: heating the mandrel to a temperature in the range 140-200° C., preferably 170° C. or above 170° C. The above listed pressures and temperatures are suitable when the first material comprises polyethylene and if the resin is an epoxy resin.

In the curing in step (iv), the temperature may be between the curing temperature of the second material and the melting temperature of the first material. This ensures that the mandrel will not melt before the second material starts to cure, which means that the mandrel can press the layer against the mold during this stage of the curing or an initial curing. The heating of the layer in step (iv) may be performed for a sufficiently long period for the resin to reach gelation. Alternatively, the heating of the layer in step (iv) may be performed for a sufficiently long period for the resin to reach vitrification or a full curing.

In step (iii), the mold may be configured to leave the aperture open to the surroundings of the mold. The step (iv) may further comprise: placing the mold in an autoclave and generating a pressurized and heated atmosphere inside the autoclave for providing the pressurized fluid and for heating the mandrel and the layer. This has the effect that the pressurized fluid enters the interior of the mandrel through the aperture. Further, the heated atmosphere will heat the mandrel and the layer by conduction through the mold. Additionally or alternatively, heating of the mandrel and the layer may also be achieved through convection via the aperture, since the pressurized fluid is heated. This is particularly the case if the heating of the atmosphere is done before the pressure of the atmosphere is increased, or if a flow of the pressurized fluid is generated in the interior of the mandrel via the aperture.

The step (iv) in the first and fourth aspects may further comprise: connecting the aperture of the mandrel to a pressure source via a pressure conduit, wherein the pressure source provides the pressurized fluid and the pressure conduit conveys the pressurized fluid to the aperture. This has the advantage that structure is not limited in size by a pressure chamber, an autoclave, or the like, which allows for a greater freedom in designing the structures. The step (iv) may further comprise: placing the mold in an oven that generates heat for heating the mandrel and the layer.

The mandrel may comprise an additional aperture for allowing a fluid to leave the interior to allow the pressurized fluid to flow through at least a portion of the interior of the mandrel. The mold may have an additional opening to allow access to the mold cavity from outside the mold. The additional opening may be configured to allow access to the additional aperture from outside the mold, or the additional aperture may be configured to be accessible from outside the mold via the additional opening.

The step (iv) may further comprise: heating the pressurized fluid and generating a flow of the pressurized fluid, wherein the flow enters the interior of the mandrel via the aperture and exits the interior of the mandrel via the additional aperture for heating the mandrel and the layer. The heating may heat the mandrel to the temperature below the melting temperature of the first material and the layer to the temperature above the curing temperature of the second material.

The flow of the pressurized fluid may be restricted at or after the additional aperture to allow a pressure to build and generate the force acting to expand the mandrel outward. With the modifications described here, there is no need for a pressure chamber, an oven, or an autoclave. This means that the dimensions of the structure are not limited and structures of greater size can be manufactured. In an alternative wording to the above, the step (iv) may further comprise: heating the pressurized fluid and generating a flow of the heated pressurized fluid through the aperture.

The step (v) may follow immediately after step (iv), which contributes to improve the efficiency of the manufacturing process. The step (v) may be performed in an autoclave or an oven. If the step (iv) involves an autoclave or an oven, the step (v) may be performed in the same autoclave or oven. In step (v), a flow of the pressurized fluid may heat the mandrel to a temperature above the melting point of the first material for melting the mandrel.

The curing in step (iv) may be a first curing, and the method may further comprise the step of:

(vii) subjecting the layer or structure to a second curing at a temperature that is greater than the temperature of the first curing.

Gelation or an initial curing of the resin may be achieved in the first curing. Vitrification or a full curing of the resin may be achieved in the second curing. The second curing in step (vii) allows for the forming of the structure in step (iv) to be performed at a lower temperature, but with the overall curing efficiency of the higher temperature in the second curing.

The step (vii) may be performed between steps (iv) and (v), simultaneous to step (v), or after step (vi). In the second curing, the temperature may be above the melting point of the first material. This allows for the melting the mandrel in steps (v) and the second curing in step (vii) to be performed simultaneously, which reduces the number of process steps and improves the efficiency of the method.

The step (v) may comprise: continuing the heating of the mandrel in step (iv) to achieve the melting the mandrel. The step (vii) may comprise: continuously heating the layer in step (iv) to achieve the second curing.

The step (vii) may be performed in an autoclave or an oven. If the step (iv) involves an autoclave or an oven, the step (vii) may be performed in the same autoclave or oven. This allows for a continuous operation and improves the efficiency of the method. The subjecting of the second material to a second curing in step (vii) may comprise: heating the layer or structure to a temperature in the range 140-200° C., preferably 170° C. or above 170° C. These temperatures are suitable when the first material comprises polyethylene and if the resin is an epoxy resin.

In the different steps of the method, each temperature that is achieved by heating may be varied or monotonically increased within an interval of temperatures. For example in step (iv), heating the mandrel to a temperature below the melting temperature of the first material may comprise the mandrel from room temperature to 120° C., and heating the layer to a temperature above the curing temperature may comprise the mandrel from room temperature to 120° C. In step (v), heating the mandrel to a temperature above the melting point of the first material may comprise heating the mandrel from 120° C. to 170° C., and in step (vii) subjecting the layer or structure to a second curing may comprise heating the layer or structure from 120° C. to 170° C.

In step (iv), an elevated pressure may be provided in the mold cavity or space left by the mandrel for pressing the layer or structure against the mold. Similarly, in step (vii), an elevated pressure may be provided in the mold cavity or space left by the mandrel for pressing the layer or structure against the mold. The elevated pressure may be of more than 5 bar, preferably more than 7 bar. This ensures that the shape of the structure formed in step (iv) is maintained to and in the second curing of step (vii).

The method may further comprise the step of:
(viii) removing the layer or structure from the mold.

The step (viii) may be performed subsequent to step (iv), between steps (iv) and (v), or between steps (v) and (vi). Additionally or alternatively, the mandrel and/or the layer or structure may be allowed to cool between steps (iv) and (v). The mandrel may be allowed to cool so that it becomes rigid, thus providing structural support to the layer, which allows for the mandrel and the layer to be removed from the mold, even if the layer has reached full cure in step (iv). As explained above, the method may comprise the step of: (vii) subjecting the layer or structure to a second curing. The removal before step (vi) thus allows for the second curing to take place at another place or time than the first curing. For example, the first curing may be performed in an autoclave and the second curing may be performed in an oven.

Removing the layer or structure in step (viii) may be between steps (vi) and (vii), or subsequent to step (vii). This is possible if the layer has reached a sufficient structural strength in the first curing for supporting itself.

The temperature above the curing temperature in step (iv) may be maintained for a sufficiently long time to reach a full curing or vitrification of the second material. This has the advantage that no additional step for full curing is necessary in the manufacturing of the structure, which has the advantage of a more efficient process.

In step (ii), providing a layer of a second material on the outside surface of the mandrel may comprise: applying one or more sheets of the second material on the mandrel. This has the advantage that the layer may have a structural integrity before being applied to the mandrel that may contribute to the structural integrity and strength of the final structure. Each of sheets may define a fiber orientation, and the sheets may be applied to define multiple fiber orientations between different layers, which contributes to increasing the strength of the final structure, or between portions of the final structure, which allows for a great freedom in designing the structure. The sheets may be prefabricated.

The fibers in the one or more sheets may form a weave or cloth fabric and the resin may impregnate the weave or cloth fabric. This contributes to improving the strength of the final structure. The one or more sheets may be applied in overlapping layers. This also contributes to improve the strength of the final structure. The one or more sheets may have an adhesive side for allowing the one or more sheets to adhere to the mandrel and/or to each other. This has the effect that the sheets can easily be applied to the mandrel and in overlapping layers, which contributes to improving the efficiency of the manufacturing method. The method of the first aspect is particularly suitable for sheets formed of a weave or cloth fabric impregnated with a resin, since these are relatively stiff, and the pressurized fluid in step (iv) may be provided at a high pressure to force the relatively stiff sheets to follow the walls of the mold cavity.

The method may comprise prior to and/or simultaneous to step (iv):
(ix) evacuating air inside the mold cavity between the mandrel and the mold.

The step (ix) has the effect that the in step (iv), the mandrel can expand outward and press layer against the mold without trapping air between the mandrel and the layer or between the layer and the mold. Trapped air could prevent the structure from reaching the desired shape, which is thus avoided and the manufacturing is improved.

The structure may form part of a greater structure. The method may further be configured to form an additional structure reinforced by fibers and joined to the structure. The mold may comprise an additional outside surface and a gap for allowing access to the mold cavity from outside the mold, and the step (iii) may further comprise: providing an additional layer of the second material on the additional outside surface of the mold and joining the additional layer to the layer provided on the outside surface of the mandrel via the gap. The step (iv) may further comprise: generating a pressure forcing the additional layer against the additional outside surface and heating the additional layer to a temperature above the curing temperature of the second material to form the additional structure.

The gap may further be configured for allowing access to the aperture from outside the mold. Thus the opening described above and the gap may be the same. This means that the aperture can be reached through the additional structure, which in turn means that the structure as such can be manufactured without any openings, which may contribute to an improved strength. The structure may constitute the hub and spokes of a wheel and the additional structure may constitute the rim of the wheel.

In all the aspects of the invention, the mandrel may be shaped to conform with or follow the shape of the mold cavity. This allows for a tight fit between the mandrel, the layer, and the mold and allows for a structure with thin and/or uniformly thick walls. Additionally or alternatively, the aperture may be the only opening to the interior of the mandrel from the outside of the mandrel. This has the effect that an increased pressure can be maintained in the interior of the mandrel, even if the surroundings of the mandrel or the mold are at a lower pressure. For example, the pressurized fluid may be generated by a compressor and conveyed to the aperture by a pipe, where the outside of the tube and the mandrel is at atmospheric pressure.

In all aspects, the mandrel may comprise a protruding portion on which the aperture is located. This means that the protruding portion is of the same material as the rest of the mandrel. The protruding portion may be configured to position the aperture on the outside of the mold, or the protruding portion may be configured to extend through the opening of the mold for positioning the aperture on the outside of the mold, when the mandrel is placed in the mold cavity. This makes the aperture easier to reach when coupling the aperture to a pressure source, which contributes to an easier handling. The protruding portion may be configured to provide a sealing between protruding portion and the mold for preventing fluid to escape or enter the mold cavity via the opening. This prevents air from leaking in between the layer and the mold, which means that the pressure can be increased in the interior of the mandrel by simply increasing the pressure at the aperture, e.g. by placing the form with the mandrel inside the mold cavity in a pressure chamber or autoclave. The mandrel may be manufactured through blow molding, rotational molding, or 3D-printing.

BRIEF DESCRIPTION OF DRAWINGS

FIGS. 1-10 illustrate an embodiment of a method for manufacturing a fiber-reinforced structure.

FIGS. 11-20 illustrate another embodiment of a method for manufacturing a fiber-reinforced structure.

FIGS. 21-30 illustrate yet another embodiment of a method for manufacturing a fiber-reinforced structure.

FIG. 31 is a front view of an embodiment of a mandrel in another embodiment for manufacturing a fiber-reinforced wheel.

FIG. 32 is a cross-sectional front view of the mandrel in FIG. 31.

FIG. 33 is a cross-sectional side view of the mandrel in FIG. 31.

FIGS. 34-43 illustrate the steps of the embodiment of a method for manufacturing a fiber-reinforced wheel.

DETAILED DESCRIPTION OF DRAWINGS

The following detailed description of example embodiments refers to the accompanying drawings. The same reference numbers re used in different drawings to identify the same or similar elements. Also, the detailed description is provided for the purpose of illustration and explanation of the different aspects of the invention. Any of the modifications or functions described above for the different aspects of the invention may be applied to embodiments below, either by replacement of described features, or by addition.

An embodiment of a method for manufacturing a fiber-reinforced structure is illustrated in FIGS. 1-10. In a first step, a mandrel 10 is provided. A perspective view of the mandrel is shown in FIG. 1*a* and a cross-sectional view taken at the middle of the mandrel 10 in the directions of its longitudinal extension is shown in FIG. 1*b*. The mandrel has an outside surface 12, a hollow interior 14, and an aperture 16. The aperture 16 allows for a fluid to enter the interior 14 of the mandrel 10. The mandrel 10 is made of a first material that is rigid at room temperature and has a melting temperature at which it melts, and the first material becomes deformable when approaching the melting temperature.

Figure 1A:
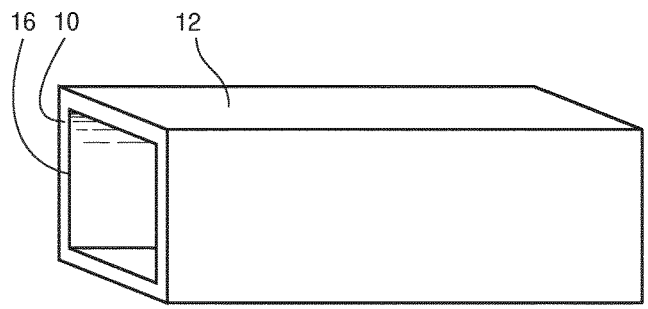
Figure 1B:
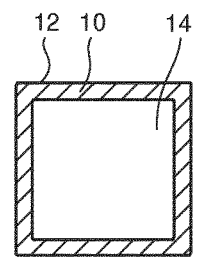
Figure 2A:
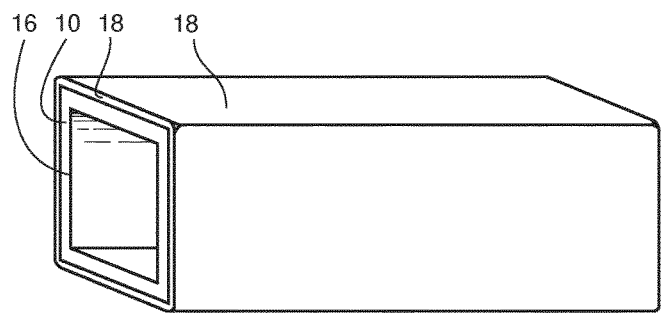
Figure 2B:
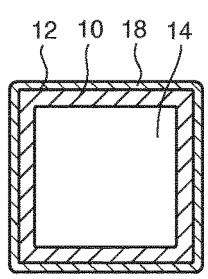

In a second step, a layer 18 of a second material is provided on the mandrel 10 on the outside surface 12 of the mandrel 10, as is shown in the perspective view of FIG. 2*a* and the cross-sectional view of FIG. 2*b*. The cross-sectional view in FIG. 2*b* corresponds to the cut in FIG. 1*b*. The layer 18 is provided without blocking the aperture 16. The second material comprises an uncured thermo-setting resin and fibers configured for reinforcing the final structure. The second material has a curing temperature below which it is pliable and above which it cures. Additionally, the curing temperature of the second material is lower than the melting temperature of the first material.

Figure 3:
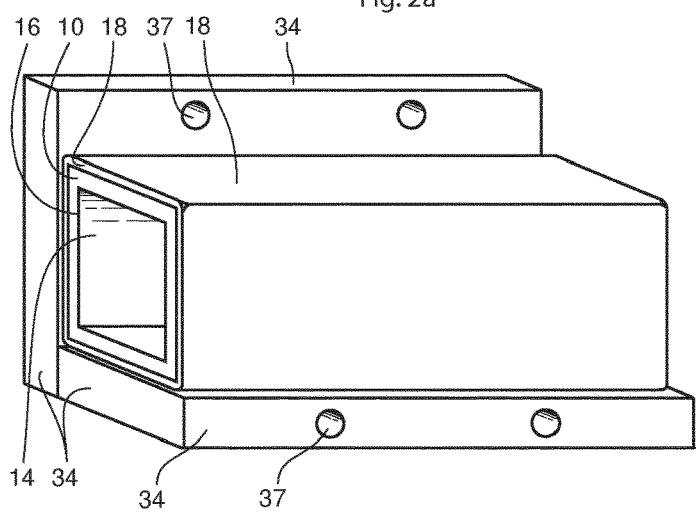
Figure 4:
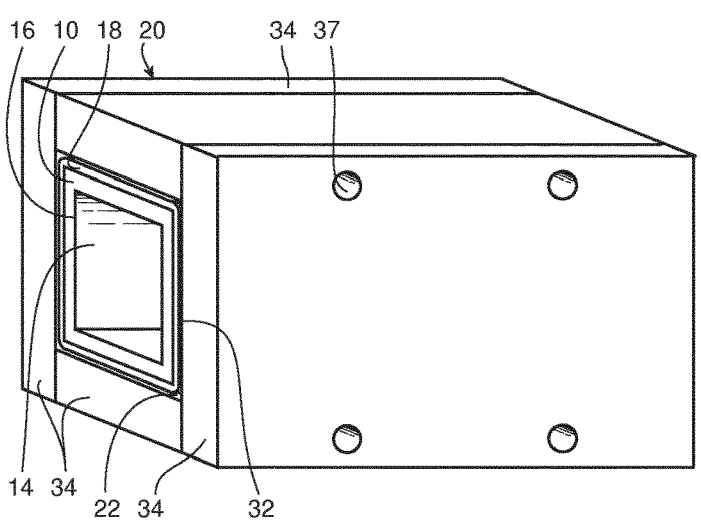

In a third step, which is illustrated in FIGS. 3 and 4, the mandrel 10 and the layer 18 are placed in a mold cavity 22 formed by a mold 20. As is shown in FIG. 4, the mold 20 has opening 32 that allows access to the aperture 16 from outside the mold 20.

In a fourth step, which is illustrated in FIGS. 5 and 6, the mandrel 10 heated to a temperature below the melting temperature of the first material, i.e. the material it is made of, so that it becomes deformable. The cross-sections in FIGS. 5*b* and 6*b* correspond to the cross-section in FIG. 1*b*. The heating is illustrated in FIGS. 5*a* and *b*. A pressurized fluid is provided at the aperture 16 for increasing the pressure in the interior 14 of the mandrel 10 and a force acting to expand the mandrel 10 outward is thus generated, and the mandrel 10 expand outward and presses layer 18 against the mold 20, which is illustrated in FIGS. 6*a* and *b*. The layer 18 is heated to a temperature above the curing temperature of the second material, i.e. the material it is made of, so that the layer 18 hardens as it is pressed against the from.

In a fifth step, the mandrel 10 is heated to a temperature above the melting point of the first material so that the mandrel 10 melts, which is illustrated in FIGS. 7*a* and *b*. The cross-section in FIG. 7*b* corresponds to the cross-section in FIG. 1*b*. In a sixth step, the melted mandrel 10 is removed from the structure 24, which is also illustrated in FIGS. 7*a* and *b*. The mold 20 and the structure 24 are formed and oriented so that the melted mandrel 10 flows out through the opening 32 of the mold 20 on its own accord.

Figure 8A:
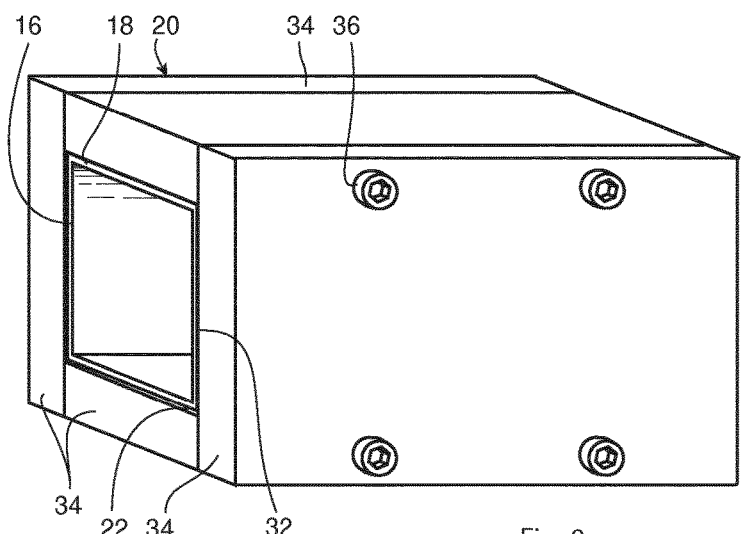
Figure 8B:
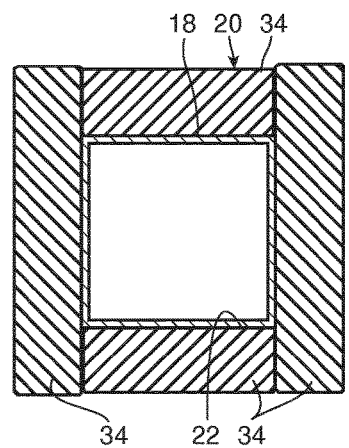

The curing in the fourth step, which is described in connection with FIGS. 6*a* and *b*, is a first or initial curing. In a seventh step, which is illustrated in FIGS. 8*a* and *b*. the layer 18 or structure 24 is subjected to a second curing at a temperature that is greater than the temperature of the first curing. The cross-section in FIG. 8*b* corresponds to the cross-section in FIG. 1*b*. Vitrification or complete curing is achieved in the second curing. In an alternative embodiment, the first curing is sufficient for reaching vitrification or full curing, and the second curing is not performed. In the second curing, the temperature is above the melting point of the first material of the mandrel 10. This allows for the mandrel 10 to melt while heating for reaching the temperature of the second curing. It has been described above that the melted mandrel 10 flows out from the mold 20 on its own accord, which means that the fifth and sixth steps are continuously performed when going from the fourth step to the seventh step. In alternative embodiments, the second curing is performed between the fourth and the fifth step, simultaneous to the fifth step, or after the sixth step.

Figure 10:
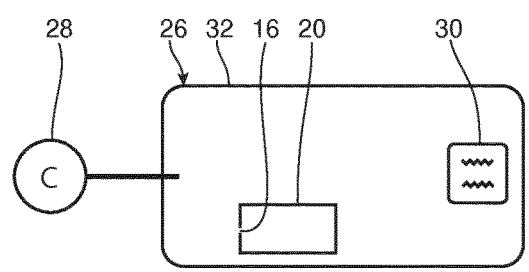

In the fourth step, the mold 20 with the mandrel 10 and layer 18 inside it are placed in an autoclave 26, which is schematically illustrated in FIG. 10. The autoclave 26 has a pressure source 28 in the form of an air compressor that can generate a pressurized atmosphere inside the pressure chamber 32 of the closed autoclave 26. The autoclave further has a heating element 30 that can heat the pressurized atmosphere. The fourth step is performed in the autoclave 26, where the heated atmosphere heats the mandrel 10 and the layer 18, both by convection through aperture 16 and conduction through the mold 20. In the third step described in relation to FIGS. 3 and 4, the aperture 16 of the mandrel 10 is left open to the surroundings of the mold 20. Thus, the pressurized atmosphere enters the interior 14 of the mandrel 10 via the aperture 16 and forced the mandrel 10 to expand outward.

The fifth to the seventh steps are also performed in the autoclave 26, where the heating element 30 increases the temperature of the atmosphere inside the autoclave 26, thus causing the heating. A pressurized atmosphere is maintained in the autoclave throughout the fourth to seventh steps, which means that an elevated pressure presses the layer 18 against the mold 20 until the vitrification or final curing is complete.

The mandrel 10 is made of polyethylene, i.e. the first material is a thermoplastic. The polyethylene has a melting temperature about 120-130° C., above which it starts to melt. The layer is composed of carbon fibers fused with an epoxy resin, i.e. the second material has these components. The epoxy resin effectively has a curing temperature of 110° C., above which it cures. After the mold 20 has been placed in the autoclave, with the mandrel 10 and the layer 18 inside it, the heating element 30 uninterruptedly heats the atmosphere inside the autoclave 26 from room temperature to about 170° C. The limited heat transport of the atmosphere inside the autoclave 26, and the thermal inertia of the mandrel 10, the layer 18, and the mold 20, cause the temperature of these components to rise slower than the temperature of the atmosphere. Thus, the curing of the layer 18 in the fourth step is smoothly followed by the melting of the mandrel 10 in the fifth step, and the removal of the melted mandrel 10 in the sixth step. The temperature is maintained at 170° C. for a sufficiently long time for the layer 18 or the structure 24 to achieve vitrification or full cure of the resin in the seventh step.

After the mold 20 has been placed in the autoclave, as described above, the pressure source 28 increases the pressure of the atmosphere to an elevated pressure in the range 7-8 bar. The pressure is maintained until the seventh step is complete. When the temperature of the mandrel approaches the melting temperature of polyethylene, the mandrel 10 becomes soft and pliable. When this happens, the elevated pressure inside the autoclave 26 forces the mandrel 10 to press the layer 18 against the mold and form the structure 24, thus enabling the fourth step of the method.

In the second step above described in relation to FIGS. 2a and b, the layer 18 is provided on the mandrel 10 by applying one or more sheets (not shown) of the second material on the mandrel 10. Each sheet is a prefabricated weave of carbon fibers impregnated with the resin. Thus, the weave of the sheets define specific orientations of the fibers. The sheets have an adhesive side that is oriented towards the mandrel 10 and the sheets are applied in several overlapping layers. The sheets are applied so that the resulting layer 18 completely enfolds and cover the outside surface 12 of the mandrel 10 or a portion of the mandrel 10. Thus, a hollow space is formed resulting in a hollow final structure 24.

Figure 9A:
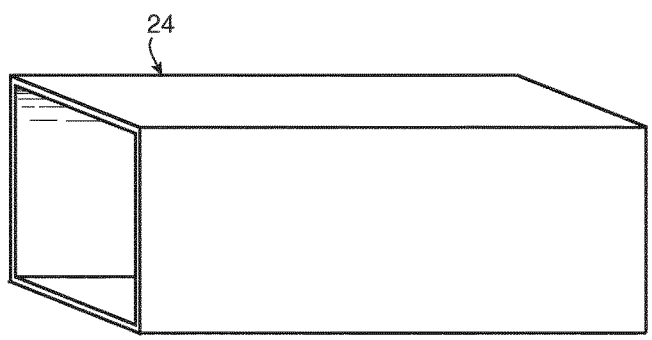
Figure 9B:
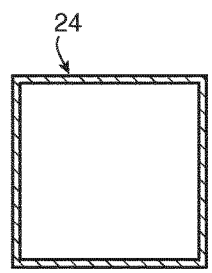

After the seventh step, the layer 18 or structure 24 is removed from the mold in an eighth step, which is illustrated in FIGS. 9a and b showing the final structure 24 manufactured by the above method. The cross-section in FIG. 9b corresponds to the cross-section in FIG. 1b. For example, the structure 24 may be used as a pipe section having a high strength to weight ratio.

As described above, the embodiment involves a mandrel 10 configured to be placed in the mold cavity 22 of the mold 20. The mold has an opening 32 to allow access to the mold cavity 22 from outside the mold 20. The mandrel 10 has a hollow interior 14 and an aperture 16, and the mandrel 10 is configured to allow the aperture 16 to be accessed via the opening when it is placed in the mold cavity 22. Further, the mandrel 10 is manufactured of a material that is rigid at room temperature and becomes soft and pliable when the temperature approaches its melting temperature. The mandrel of the second aspect allows for the method of first aspect to be performed.

A molding system is also described above in relation to FIGS. 1-10. The molding system consists of a mold 20 and a mandrel 10. The mold 20 has a mold cavity 22 and an opening 32 to allow access to the mold cavity 22 from outside the mold 20. The mandrel 10 has a hollow interior 14 and an aperture 16 that allows a fluid to enter the interior 14. The aperture 16 is located on the mandrel 10 so that it can be accessed via the opening 32 when the mandrel 10 is placed in the mold cavity 22. The mandrel 10 is smaller than the mold cavity 22, thus forming a space between mandrel 10 and the mold 20 for housing the layer 18.

In the above embodiment, the mandrel 10 is shaped to conform with and follow the shape of the mold cavity 22. This is achieved by having a mandrel with a square cross-section, as is illustrated in FIG. 1b, and a mold composed of four rectangular wall sections 34 that are assembled at right angles and locked together by screws 36 and holes 37 in the wall sections 34, thus forming the mold 20 with a mold cavity having a square cross-section, as is shown in FIG. 5b. There is a tight fit between the mandrel 10, the layer 18, and the mold 20, which results in a final structure 24 with thin walls. Additionally, the aperture 16 is the only opening to the interior 14 of the mandrel 10 from the outside of the mandrel 10.

A second embodiment of a method for manufacturing a fiber-reinforced structure is illustrated in FIGS. 11-20. This embodiment has many features in common with the first embodiment described in relation to FIGS. 1-10. Only the differences are described here and features having the same function share the same number indexing. The number indexes of some of the features have been given a prime to distinguish them functionally. The steps illustrated in FIGS. 11-19 resemble to the steps in FIGS. 1-9, with the step in FIG. 11 corresponding to the step in FIG. 1, the step in FIG. 12 corresponding to the step in FIG. 2, etc.

Figure 11A:
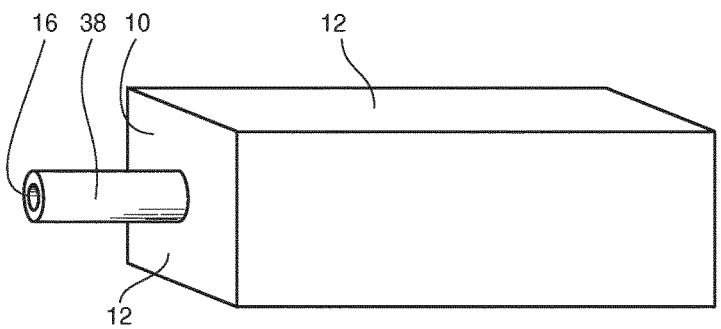
Figure 11B:
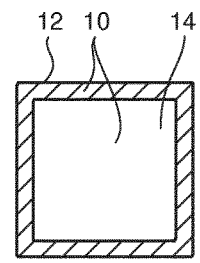
Figure 12A:
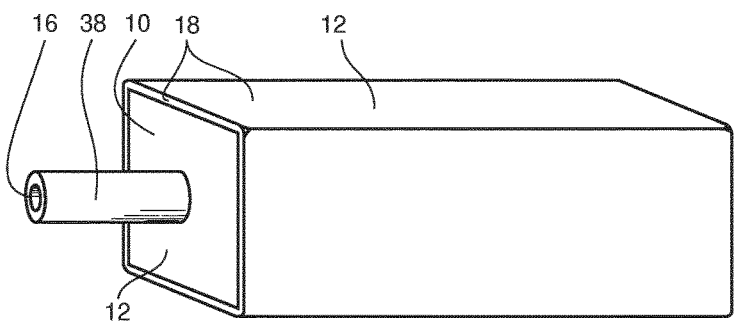
Figure 12B:
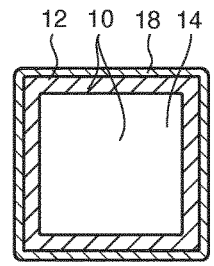

In the first step illustrated in FIGS. 11a and b, the mandrel 10 is provided at one end with a protruding portion 38 on which the aperture 16 is located. The other end of the mandrel 10 is closed so that the aperture 16 is the only access to the interior 14 of the mandrel 10. The protruding portion 38 is of the same material as the rest of the mandrel 10. In the second step, the layer 18 is applied to the outside surface 12 of the mandrel 10 in the same manner as in the first embodiment. However, the end at the protruding portion 38 is not covered by the layer 18, which means that only a portion of the outside surface 12 is now covered by the layer 18.

Figure 13:
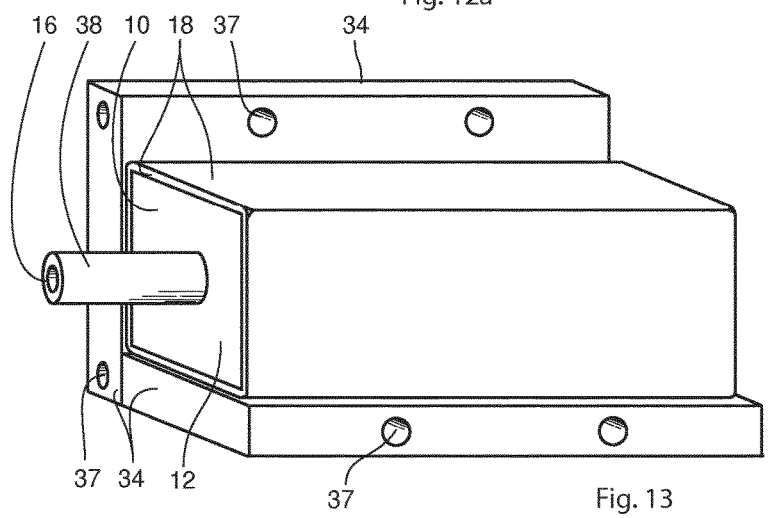
Figure 14:
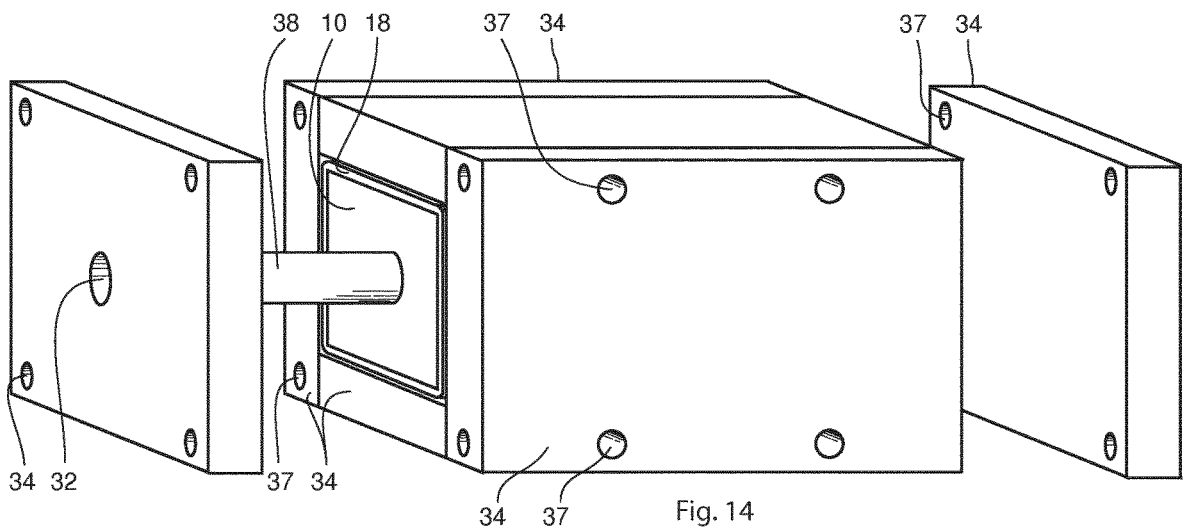
Figure 18A:
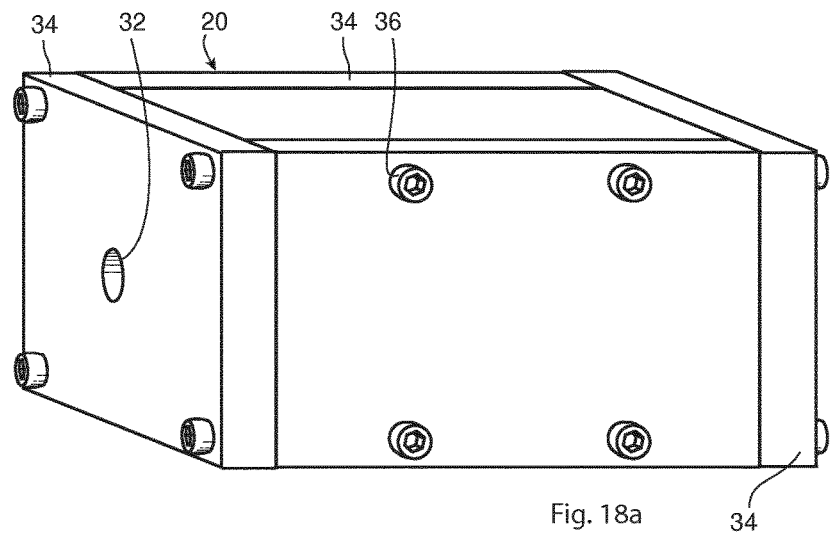
Figure 18B:
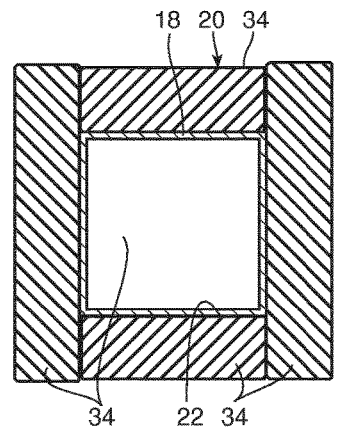
Figure 19A:
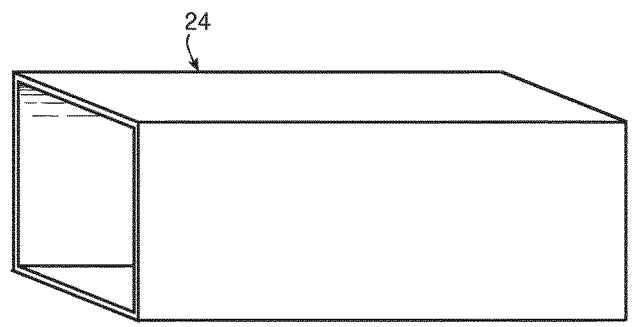
Figure 19B:
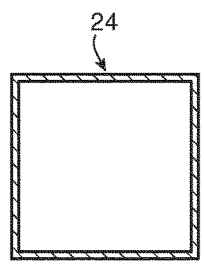

In the third step illustrated in FIGS. 13 and 14, the mandrel 10 and the layer 18 are placed in a mold cavity 22 formed by a mold 20. The mold 20 has an opening 32 with a circular cross-section through which the protruding portion 38 extends and positions the aperture 16 on the outside of the mold 20. The protruding portion 38 engages the inside of the opening 32 and provides a sealing between protruding 38 portion.

Figure 20:
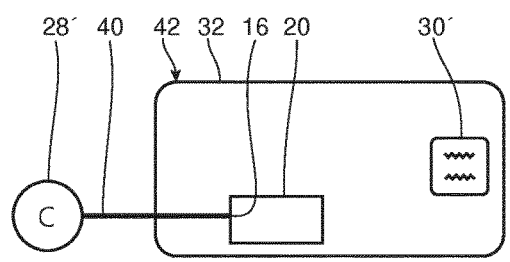

In the fourth step, which is illustrated in FIGS. 15 and 16, the aperture 14 is connected to via a pressure conduit 40 to a pressure source 28' in the form of an air compressor, as is schematically shown in FIG. 20. The pressure source 28' provides the pressurized fluid and the pressure conduit 40 conveys the pressurized fluid to the aperture 16. The mold 20, with the mandrel 10 and the layer 18 inside it, is placed in an oven 42 having a heating element 30' that heats the atmosphere inside the oven 42. The heated atmosphere heats the mold 20, which in turn heats the layer 18 and the mandrel 10.

In the fifth step, the mandrel 10 is heated so that the mandrel 10, including its protruding portion 38, melts, which is illustrated in FIGS. 17a and b. The fifth step is immediately followed by the seventh step illustrated in FIGS. 18a and b, which means that the layer 18 or structure 24 is subjected to the second curing with the melted mandrel 10 inside it. The sixth step, in which the melted mandrel 10 is removed from the structure 24, and the eighth step, in which the layer 18 or structure 24 is removed from the mold, are performed at the same time. The mold 20 is tilted so that the melted mandrel 10 can flow out through the opening 32, after which the mold 20 is opened to reveal the final structure 24 illustrated in FIGS. 19a and b. The sixth and eighth steps are not explicitly shown in the Figures.

A third embodiment of a method for manufacturing a fiber-reinforced structure is illustrated in FIGS. 21-30. This embodiment also shares many features with the first embodiment described in relation to FIGS. 1-10. Only the differences are described here and features having the same function share the same number indexing. The number indexing of some of the features have been given a prime to distinguish them from the first embodiment. The steps illustrated in FIGS. 21-29 resemble to the steps in FIGS. 1-9, with the step in FIG. 11 corresponding to the step in FIG. 1, the step in FIG. 12 corresponding to the step in FIG. 2, etc.

Figure 21A:
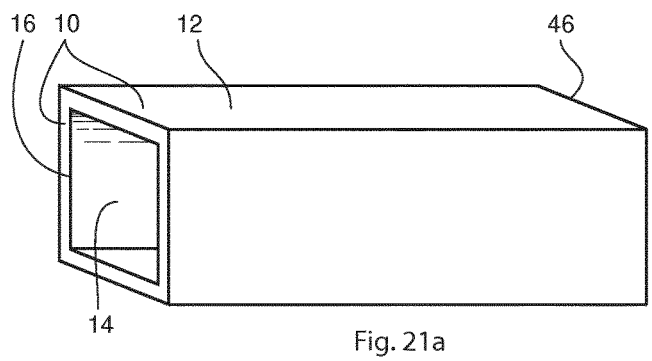
Figure 21B:
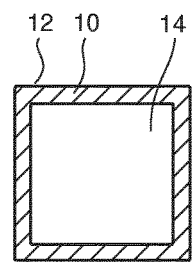
Figure 22A:
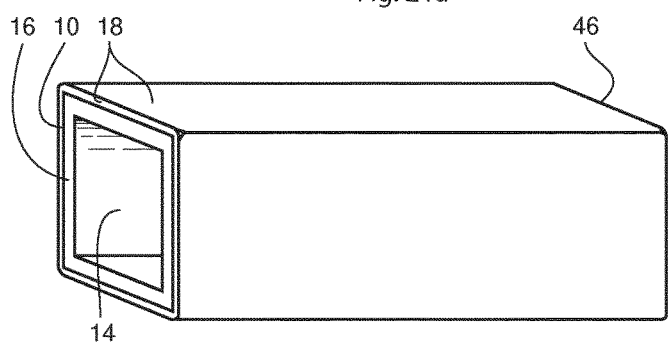
Figure 22B:
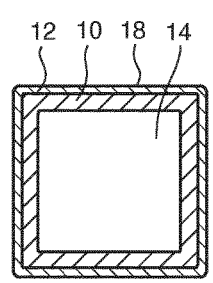

In the first step illustrated in FIGS. 21 and b, the mandrel 10 is provided an additional aperture 46, which is identical in shape and size as the aperture 16, which means that the mandrel 10 effectively is a tube with a square cross-section. Thus, a fluid can flow into the interior 14 of the mandrel 10 through the aperture 16 and out through the additional aperture 46. In the second step, the layer 18 is applied to the outside surface 12 of the mandrel 10 in the same manner as in the first embodiment, with the difference that the additional aperture 46 is not covered by the layer 18.

Figure 23:
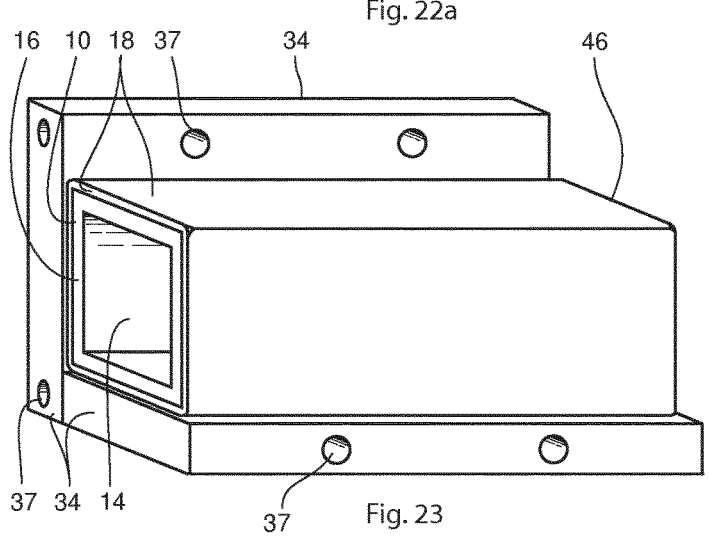
Figure 24:
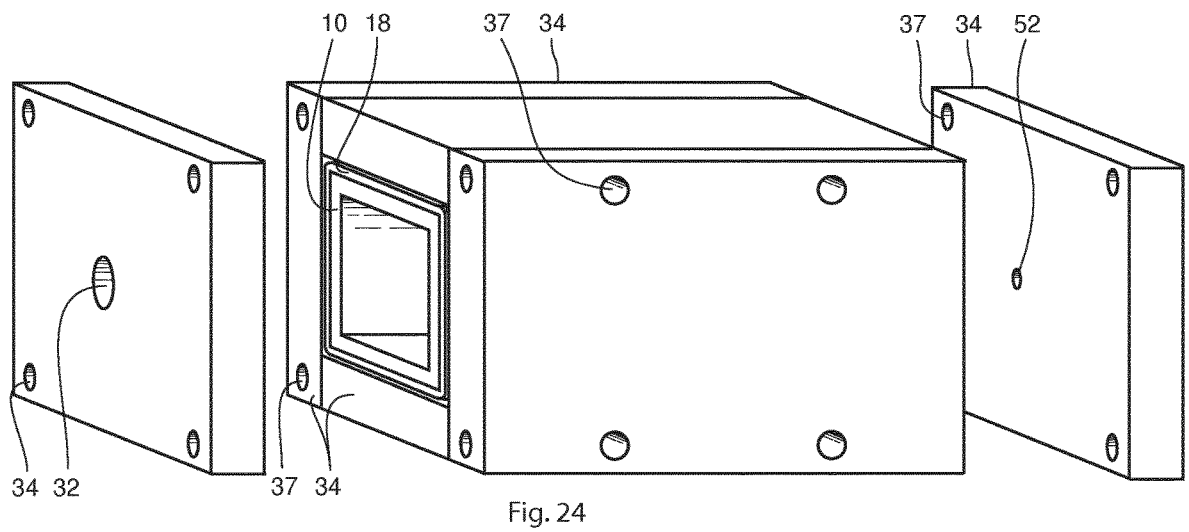
Figures 28A, 28B:
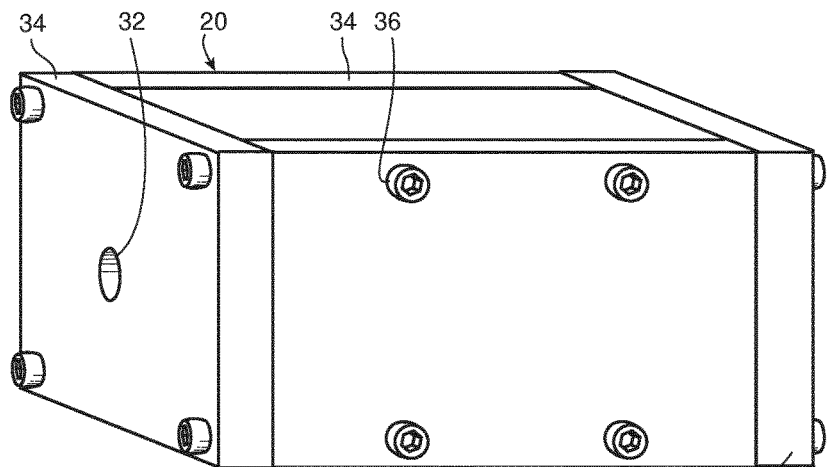
Figures 29A, 29B:
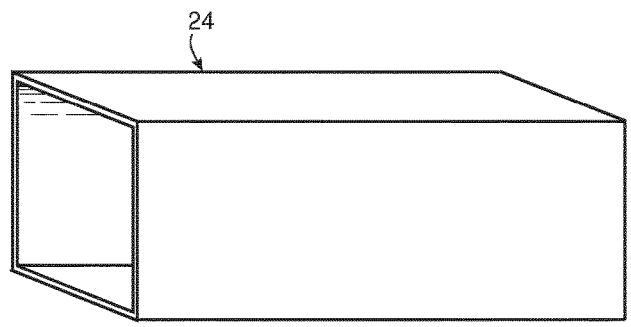

In the third step illustrated in FIGS. 23 and 24, the mandrel 10 and the layer 18 are placed in a mold cavity 22 formed by a mold 20. The mold 20 has an opening 32 and an additional opening 52 allowing access to the mold cavity 22 from outside the mold and allowing a flow of a fluid to enter the interior 14 of the mandrel 10 via the opening 32 and exit the interior of the mandrel 10 via the additional opening 52.

Figure 30:
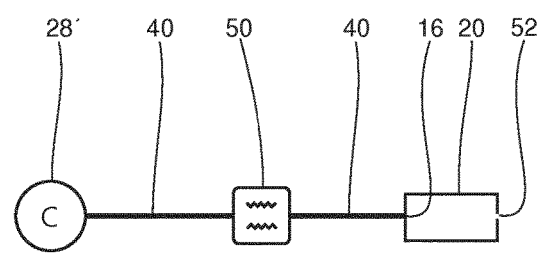

In the fourth step, which is illustrated in FIGS. 25 and 26, the opening 32 is connected to via a pressure conduit 40 to a pressure source 28' in the form of an air compressor, as is schematically shown in FIG. 30. The pressure source 28' provides the pressurized fluid and the pressure conduit 40 conveys the pressurized fluid to the opening 32 and thereby also the aperture 16. The pressure conduit 40 passes through a heater 50 heating the pressurized fluid. The heated pressurized fluid enters the interior 14 of the mandrel 10 via the opening 32 and exits the interior 14 via the additional opening. The heated pressurized fluid heats the mandrel 10, which in turn heats the layer 18. The additional opening 52 is smaller than the opening 32 so that the flow of the pressurized fluid is restricted at the additional aperture 46, which causes a pressure to build up and generate the force acting to expand the mandrel 10 outward.

In the fifth step, the heater 50 provides more heat to the flow of pressurized fluid, which causes the melting of the mandrel 10, which is illustrated in FIGS. 17a and b. The fifth step is immediately followed by the seventh step illustrated in FIGS. 28a and b, in which the pressurized fluid continues to heat the layer 18 or structure 24, thus subjecting the layer 18 or structure 24 to the second curing. The sixth step, in which the melted mandrel 10 is removed from the structure 24, and the eighth step, in which the layer 18 or structure 24 is removed from the mold, are performed at the same time. The mold 20 is tilted so that the melted mandrel 10 can flow out through the opening 32, after which the mold 20 is opened to reveal the final structure 24 illustrated in FIGS. 29a and b. The sixth and eighth steps are not explicitly shown in the Figures.

A fourth embodiment of a method for manufacturing a fiber-reinforced structure is illustrated in FIGS. 31-42, where the structure 24 is a wheel for a land vehicle. This embodiment has many features in common with the first embodiment described in relation to FIGS. 1-10. Only the differences with respect to the first embodiment are described here and features having the same function share the same number indexing. The number indexing of some of the features have been given a prime to distinguish them from the first embodiment.

In the first step illustrated in FIGS. 31 to 34, the mandrel 10 is provided. FIG. 31 is a front view, FIG. 32 a cross-sectional front view, and FIG. 33 a cross-sectional side view taken along the vertical symmetry line in FIG. 31. The mandrel has a hollow annular center 54 and five hollow protrusions 56 extending symmetrically outwards from the annular center 54. The annular center 54 and the protrusions are joined so that they form a single hollow interior 14 of the mandrel 10. The annular center 54 is to form a hollow space inside a wheel hub, and each of the protrusions 56 is to form a hollow space inside a spoke joined to the hub. The rotational axis 58 of the wheel to be manufactured is indicated by a point and a dashed line.

The protruding portion 38 on which the aperture 16 is located is joined to the annular center. The protruding portion 38 is of the same material as the rest of the mandrel 10. FIG. 34 is a replication of the FIG. 33, but rotated to conform to the figures illustrating the subsequent steps. The FIGS. 35 to 42 are all cross-sections corresponding to the cross-section of FIG. 33.

In the second step, which is illustrated in FIG. 35, the layer 18 is applied to the outside surface 12 of the mandrel 10 in the same manner as in the first embodiment. Apart from the protruding portion 38, the complete mandrel 10 is covered. This means that the layer 18 is provided with an opening 39 at the protruding portion 38. The opening 39 is small compared with the dimensions of the mandrel 10 and prevents the mandrel 10 from being removed through the opening 39. However, if the mandrel 10 is melted, it can be removed through the opening 39.

In the third step illustrated in FIG. 36, the mandrel 10 and the layer 18 are placed in the mold cavity 22 formed by a mold 20. The illustration of the mold 20 has been on the left side to fit in the drawing. The mold 20 is constituted by a first part 60 and a second part 62 held together by a bolt 64. The mandrel 10 is shaped to conform with and follow the shape of the mold cavity 22 so that it leaves space for the layer 18 inside the mold cavity 22. The mold has five gaps 66, each gap 66 being positioned at the tip 68 of a protrusion 56 of the mandrel 10 and allows access to the mandrel 10 from outside the mold 20.

The mold 20 has additional outside surface 70 and an additional layer 78 of the second material is applied to the additional outside surface 70 of the mold and joined to the layer 18 provided on the outside surface 12 of the mandrel 10 via all the gaps 66. The additional layer 78 is applied in sheets in the same manner as the layer 18, which is described in relation to FIGS. 2a and b above. The additional layer 78 is to form the cylindrical sleeve and the free edges of a rim of the final wheel.

The mold 20 has an opening 32 with a circular cross-section through which the protruding portion 38 extends and positions the aperture 16 on the outside of the mold 20. The protruding portion 38 engages the inside of the opening 32 provide a sealing between protruding portion 38 and the mold 20.

Figure 37:
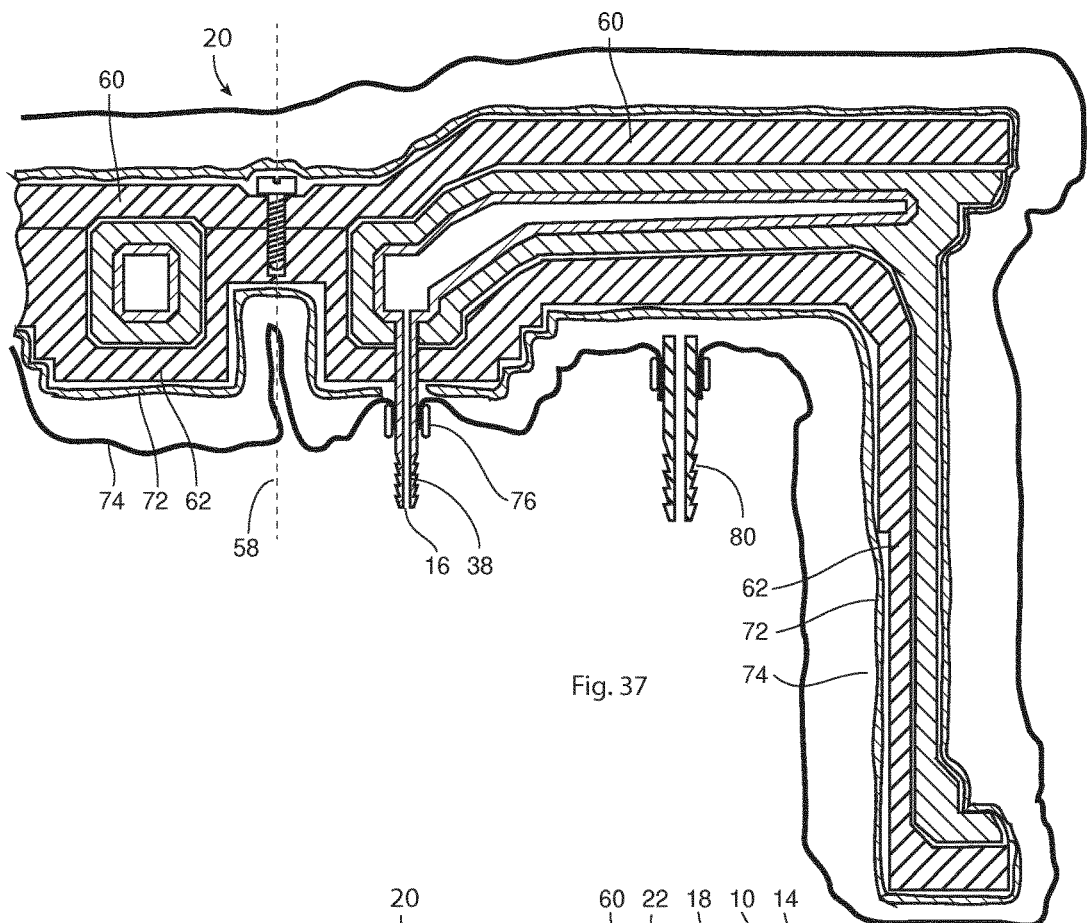
Figure 38:
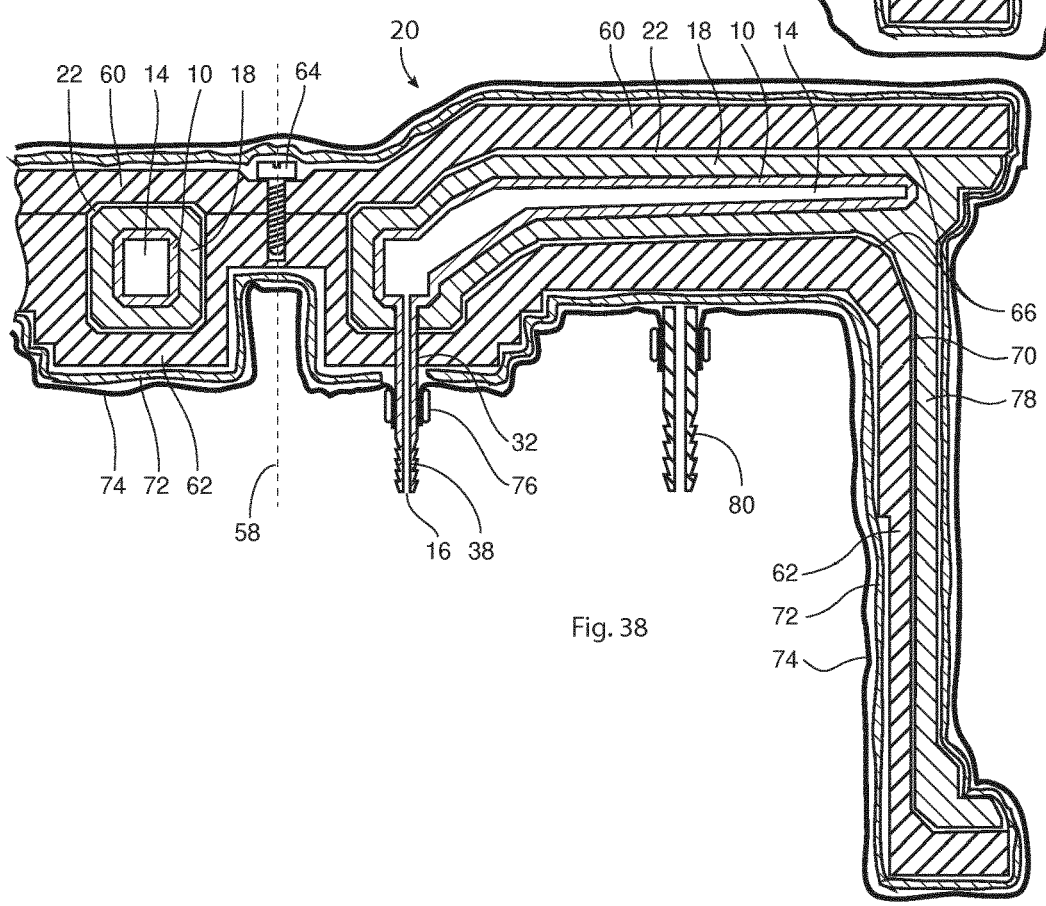
Figure 39:
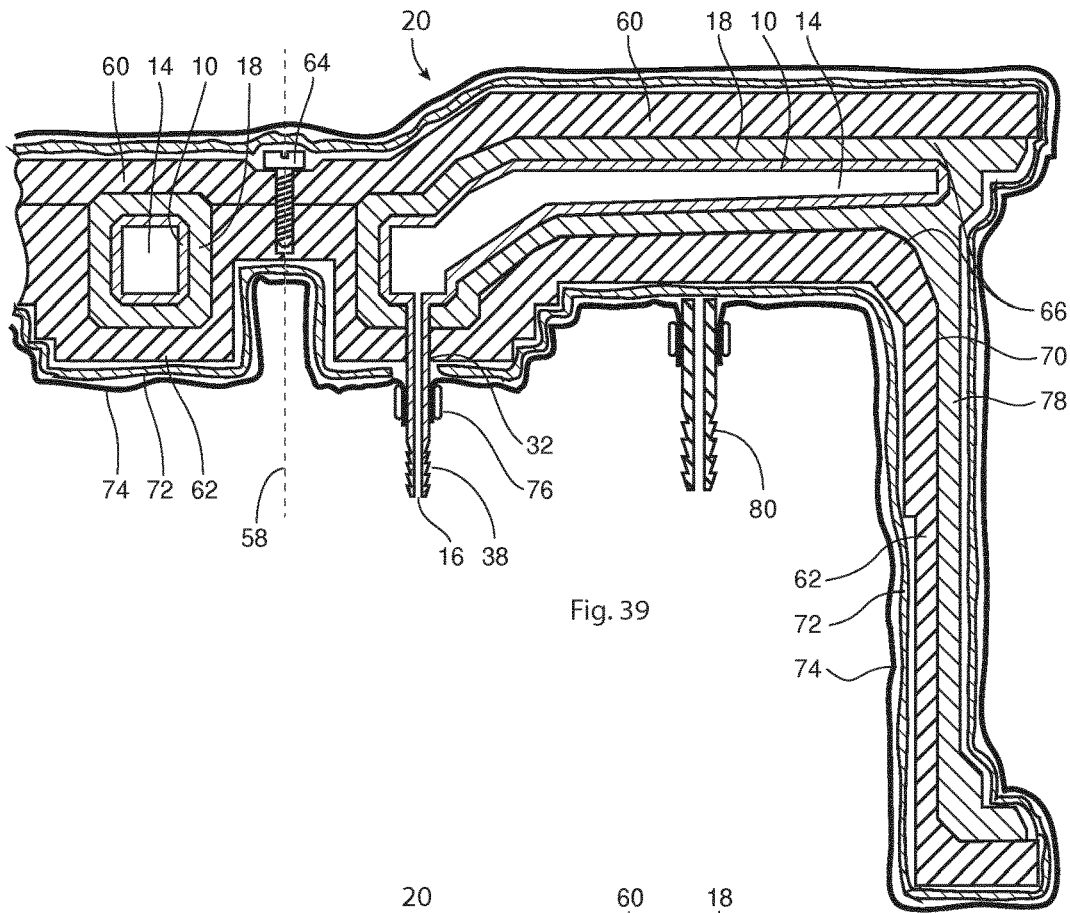
Figure 43:
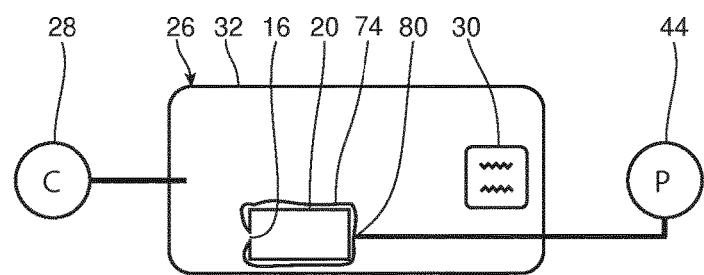

The fourth step is illustrated in FIGS. 37 to 39. The whole mold 20 is dressed in a fleece 72 and put in an airtight bag 74, which is illustrated in FIG. 37. The bag has an air-tight lead-through 76 for the protruding portion 38 and an outlet 80 through which air inside the bag can be evacuated. The mold 10 and the bag 74 are placed in an autoclave 26, as is schematically illustrated in FIG. 43. A pump 44 coupled to the outlet 80 of the bag 74 and the bag is evacuated. The fleece 72 prevents a sealing between the bag 74 and the mold 20, thus allowing the whole inside of the bag to be evacuated, which is illustrated in FIG. 38. Air will then leak out between the first part 60 and the second part 62 of the mold 20. This constitutes the ninth step, in which air inside the mold cavity between the mandrel 10 and the mold 20 and between the additional layer 78 and the additional outside surface 70 is evacuated.

As in the first embodiment, the autoclave 26 has a pressure source 28 in the form of an air compressor that can generate a pressurized atmosphere inside the pressure chamber 32 of the closed autoclave 26. The autoclave further has a heating element 30 that can heat the pressurized atmosphere. The fourth step is performed in the autoclave 26, where the heated atmosphere heats the whole contents inside the bag 74, which includes the mandrel 10 and the layer 18. The pressurized atmosphere enters the interior 14 of the mandrel 10 via the aperture 16 and forces the mandrel 10 to expand outward and press the layer against the mold 20, after which the layer 18 cures in this position, as is illustrated in FIG. 39.

Simultaneously, the heated pressurized atmosphere also forces the additional layer 78 against the additional outside surface 70 and heats the additional layer 78 to a temperature above the curing temperature of the second material, which is also illustrated in FIG. 39.

Figure 40:
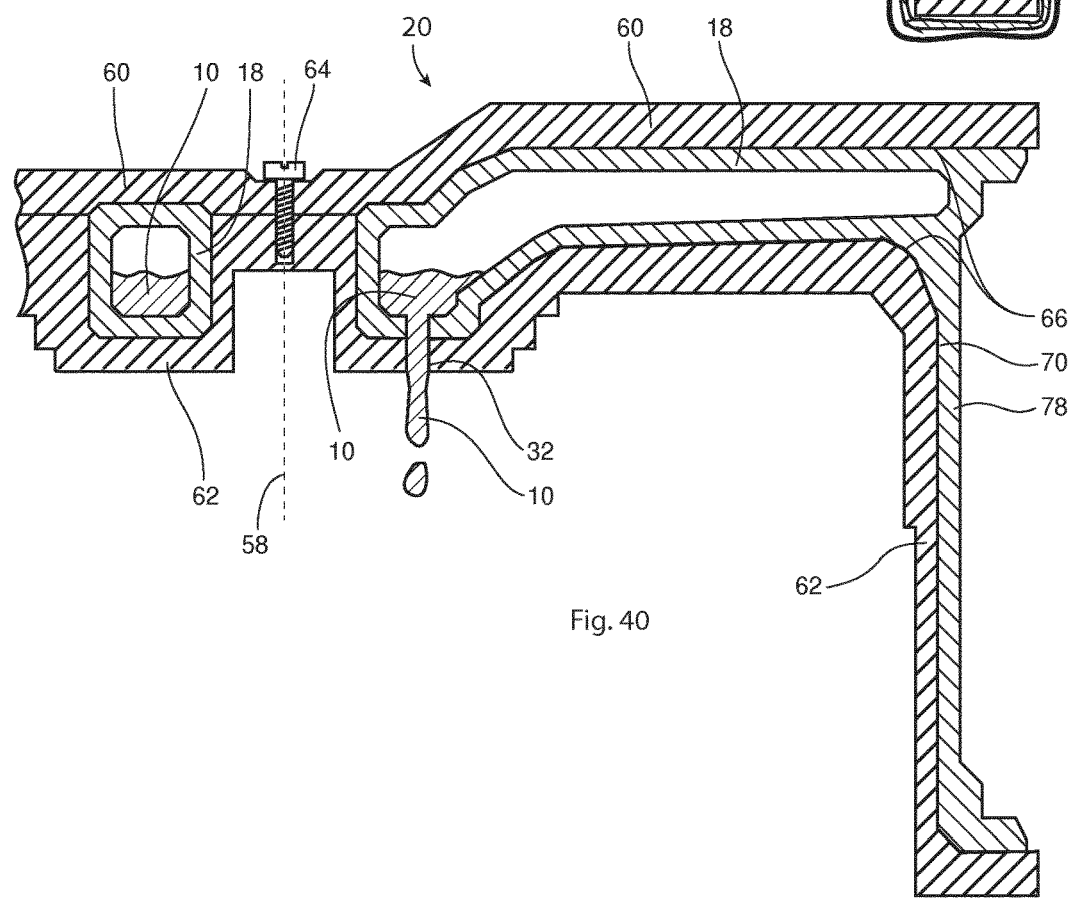
Figure 41:
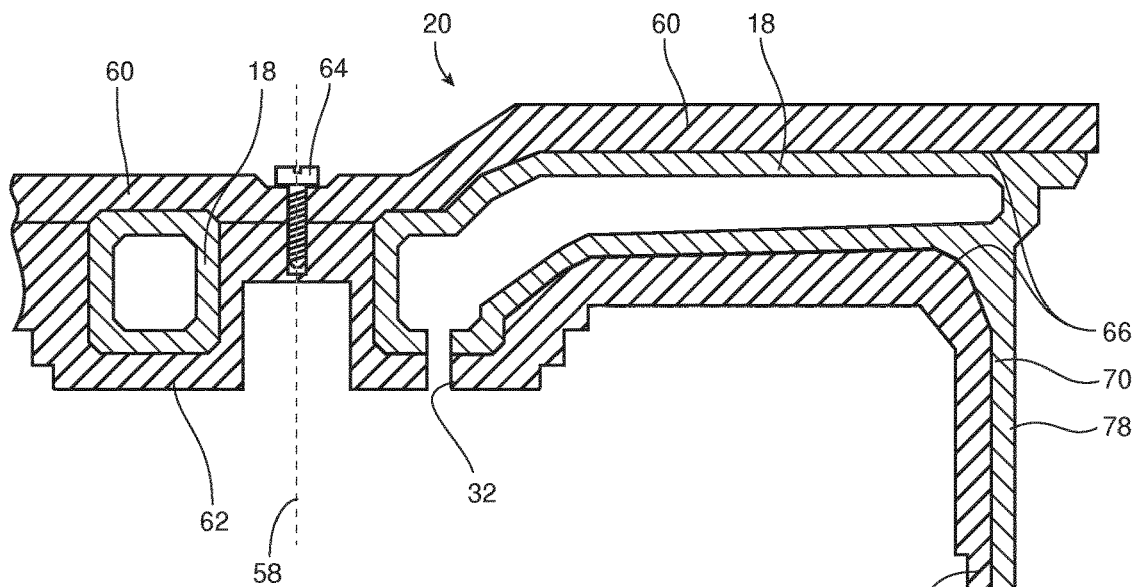

The fourth step is concluded by removing the mold from the bag 74. This is followed by the fifth step in which the mandrel 10 is heated to a temperature above the melting point of the first material so that the mandrel 10 melts. This is followed by the sixth step, in which the melted mandrel 10 flows out through the opening 32 of the mold 20 on its own accord. The fifth and sixth steps are illustrated in FIG. 40. The additional curing of the seventh step is illustrated in FIG. 41. The fourth embodiment differs from the first embodiment in that autoclave 26 is briefly opened for allowing the removal of the bag 74 at the end of the fourth step described above. The heating and pressurization is interrupted before opening the autoclave, and resumed after closing the autoclave 26.

Figure 42:
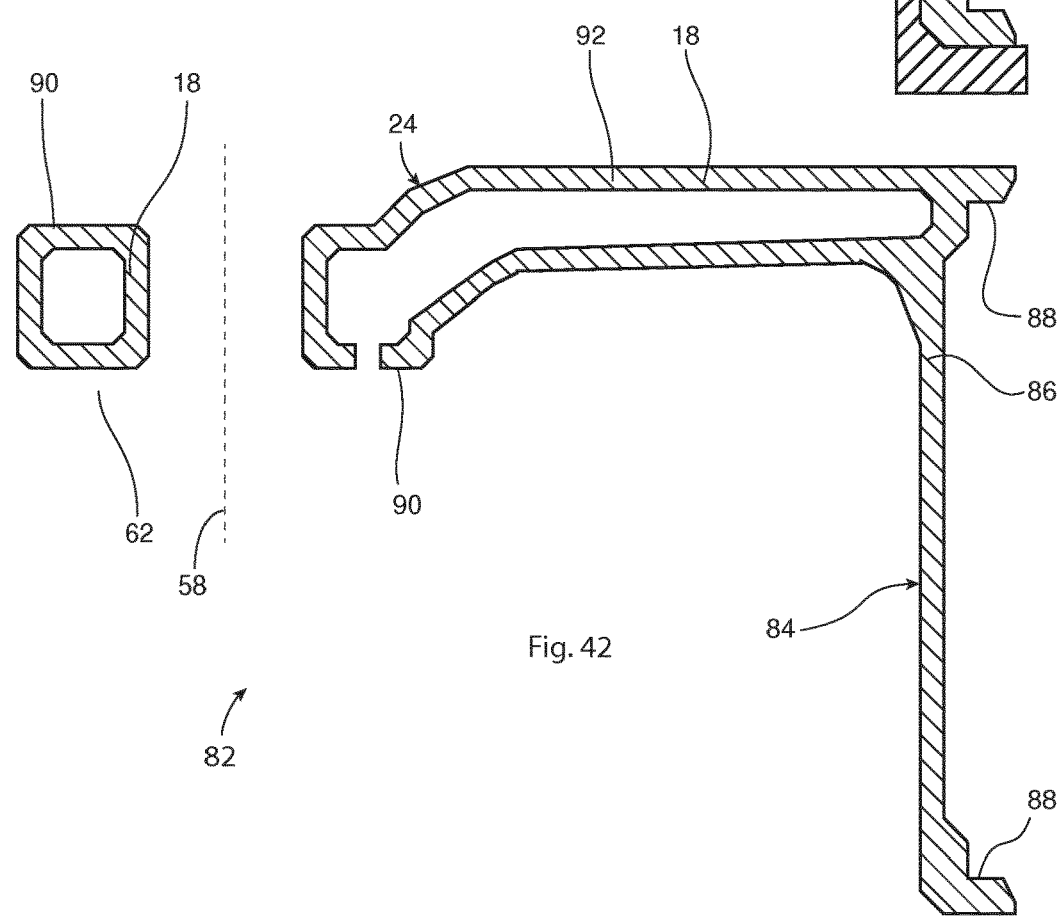

In the seventh step, which is illustrated in FIG. 41, the layer 18 and the additional layer 78 are subjected to a second curing similar to the second curing in the first embodiment. The seventh step is followed by an eighth step in which the layer 18 or structure 24 is removed from the mold 20. This is illustrated in FIG. 42, showing a cross-sectional side view of a fiber-reinforced wheel 82 having a rim 84 composed of a cylindrical sleeve 86 and two annular free edges 88, and a hollow hub 90 joined to the inside of the rim 84 by five hollow spokes 92.

Figure 44:
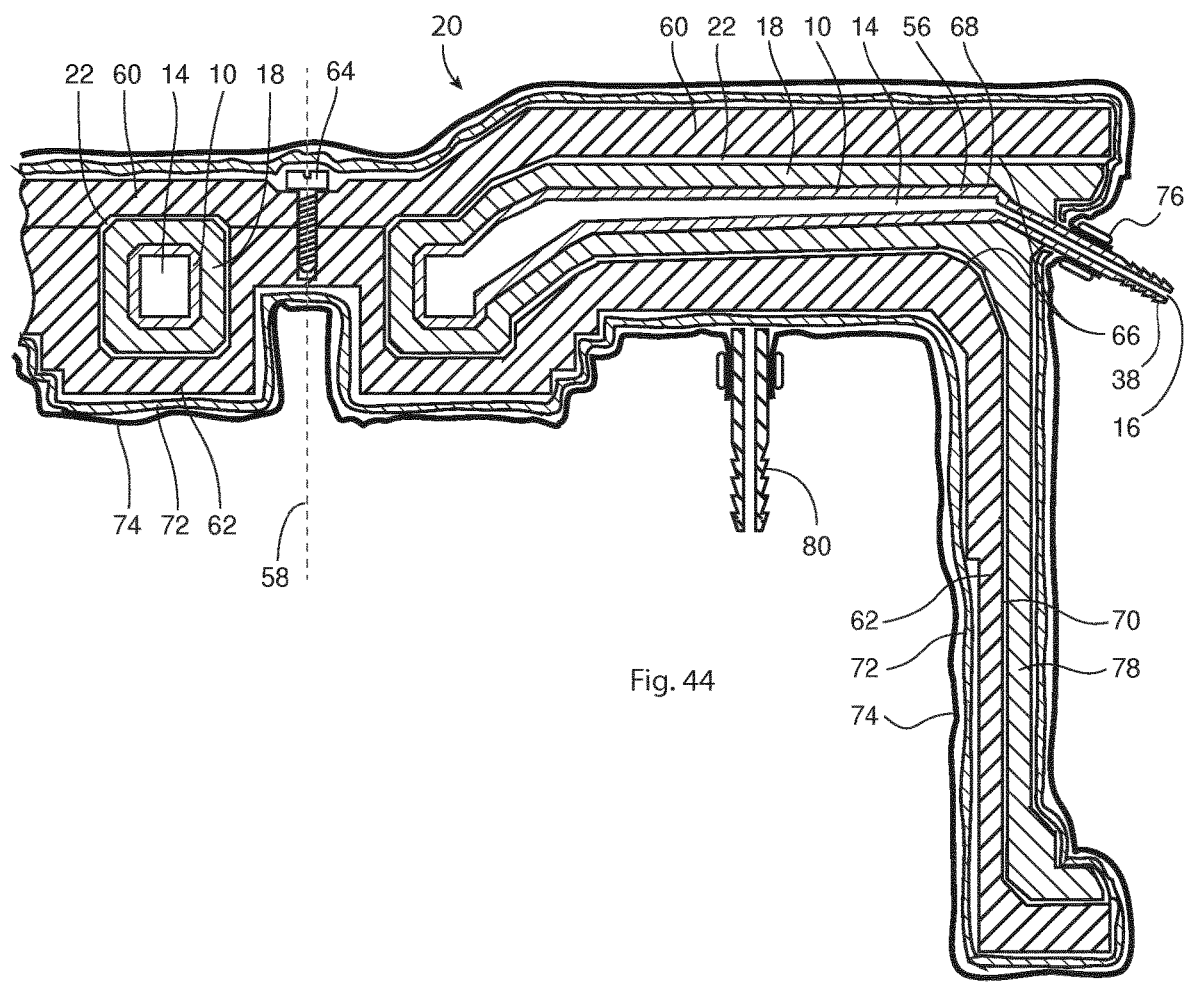
FIG. 44 illustrates a stage in another embodiment of a method for manufacturing a fiber-reinforced wheel.

In an alternative embodiment to the fourth embodiment, the protruding portion 38 is located on the mandrel 10 at the tip 68 of one of the protrusions 58 so that it extends through one of the gaps 66. Thus, the gap 66 has the function of the opening, but with the difference that there is no sealing between the protruding portion and the opening. This alternative embodiment is illustrated in FIG. 44, showing the status at the conclusion of the fourth step. The mold 20 remains in the bag 74 until after the additional curing in the seventh step and the contents of the bag 74 is heated continuously in the heated pressurized atmosphere inside the autoclave from the fourth step to the conclusion of the seventh step. The sixth step is not performed before the seventh step. This means that the melted mandrel 10 remains inside the mold 20 during the additional curing, as in the second embodiment.

The protruding portion 38 leaves an access hole 94 in the final rim through which the hollow inside of the spoke can be reached. After the mold has been removed from the bag 74, corresponding holes are drilled in each of the other spokes. This is followed by the sixth step, in which the wheel is rotated around the rotational axis 58 so that the melted mandrel 10 is forced out through the holes and is thereby removed from the structure. This is followed by the eighth step, in which the final structure 24 or wheel 82 is removed from the mold 20.

ITEMLIST 10 mandrel
12 outside surface
14 hollow interior
16 aperture
18 layer
20 mold
22 mold cavity
24 structure
26 autoclave
28 pressure source
30 heating element 32 opening of mold
34 rectangular wall sections
36 screws
37 holes
38 protruding portion
40 pressure conduit
42 oven
44 pump
50 heater
52 additional opening of mold
54 annular center
56 protrusion
58 rotational axis
60 first part
62 second part
64 bolt
66 gap
68 tip of protrusion
70 additional outside surface
72 fleece
74 bag
76 lead-throughs
78 additional layer
80 outlet
82 wheel
84 rim
86 cylindrical sleeve
88 free edges
90 hub
92 spokes
94 access hole

The invention claimed is:

1. A method for manufacturing a structure reinforced by fibers, the method comprises:
   (i) providing a mandrel of a first material, wherein the mandrel comprises an outside surface, a hollow interior, and an aperture for allowing a fluid to enter the interior, the first material is rigid at room temperature and has a melting temperature at which it melts, and the first material becomes deformable when approaching the melting temperature,
   (ii) providing a layer of a second material on the outside surface of the mandrel without blocking the aperture, wherein the second material comprises an uncured thermo-setting resin and fibers configured for reinforcing the structure, the second material has a curing temperature below which it is pliable and above which it cures,
   (iii) placing the mandrel and the layer in a mold cavity formed by a mold, wherein the mold is configured to allow a fluid to reach the aperture of the mandrel,
   (iv) introducing a pressurized fluid into the interior of the mandrel via the aperture for generating a force acting to expand the mandrel outward, heating the mandrel to a temperature below the melting temperature of the first material for making the mandrel deformable and allowing the mandrel to expand outward and press the layer against the mold, and heating the layer to a temperature above the curing temperature of the second material to cure and form the structure in a first curing,
   (v) heating the mandrel to a temperature above the melting point of the first material for melting the mandrel, and
   (vi) subjecting the structure to a second curing at a temperature above the melting point of the first material.

2. The method according to claim 1, wherein the structure is a hollow structure, and in step (ii) the layer is provided to enclose or enfold the mandrel or a portion of the mandrel.

3. The method according to claim 1, wherein the first material is a thermoplastic, the resin comprises an epoxy resin, and/or the fibers comprise carbon fibers.

4. The method according to claim 1, wherein in step (iii), the mold is configured to leave the aperture open to the surroundings of the mold, and the step (iv) further comprises: placing the mold in an autoclave and generating a pressurized and heated atmosphere inside the autoclave for providing the pressurized fluid and for heating the mandrel and the layer.

5. The method according to claim 1, wherein the step (iv) further comprises: connecting the aperture of the mandrel to a pressure source via a pressure conduit, wherein the pressure source provides the pressurized fluid and the pressure conduit conveys the pressurized fluid to the aperture, and the step (iv) further comprises: placing the mold in an oven generating heat for heating the mandrel and the layer.

6. The method according to claim 1 wherein the subjecting of the second material to a second curing in step (vi) comprises: heating the layer or structure to a temperature in the range 170-200° C.

7. The method according to claim 1, wherein in step (ii), providing layer of a second material on the outside surface of the mandrel comprises:
   applying one or more sheets of the second material on the mandrel.

8. The method according to claim 1, wherein the method comprises prior to and/or simultaneous to step (iv):
   (ix) evacuating air inside the mold cavity between the mandrel and the mold.

9. The method according to claim 1, wherein the step (ii) further comprises: providing the layer with one or more openings, wherein each of the one or more openings is configured to prevent the mandrel from being removed through the one or more openings prior to a melting of the mandrel, and wherein each of the one or more openings is configured to allow the mandrel to be removed through the one or more openings subsequent to a melting of the mandrel.

10. The method according to claim 1, wherein the method is further configured to form an additional structure reinforced by fibers and joined to the structure, and wherein the mold comprises an additional outside surface and a gap for allowing access to the mold cavity outside the mold, and the step (iii) further comprises:
    providing an additional layer of the second material on the additional outside surface of the mold and joining the additional layer to the layer provided on the outside surface of the mandrel via the gap.

11. The method according to claim 1, wherein the method further comprises: removing the melted mandrel from the structure.

12. The method according to claim 1, wherein removing the melted mandrel is prior to subjecting the structure to a second curing.

13. The method according to claim 1, wherein in the second curing an elevated pressure is provided in the space left by the melted mandrel pressing the structure against the mold.

14. The method according to claim 1, wherein gelation of the resin is achieved in the first curing and vitrification of the resin is achieved in the second curing.

15. The method according to claim 1, wherein the method further comprises the step of: removing the structure from the mold prior to subjecting the structure to the second curing.

16. The method according to claim 3, wherein the method further comprises the step of: removing the structure from the mold prior to subjecting the structure to the second curing.

17. The method according to claim 1, wherein the heating of the mandrel and the layer in step (iv): heating the mandrel and the layer to a temperature in the range 110-140° C.

* * * * *